United States Patent [19]

Sasaki et al.

[11] Patent Number: 5,202,756
[45] Date of Patent: Apr. 13, 1993

[54] COLOR SIGNAL PROCESSING APPARATUS USING PLURAL LUMINANCE SIGNALS

[75] Inventors: Takashi Sasaki, Yokohama; Akihiko Shiraishi, Kawasaki; Mayumi Yamamoto, Tokyo, all of Japan

[73] Assignee: Canon Kabushiki Kaisha, Tokyo, Japan

[21] Appl. No.: 913,978

[22] Filed: Jul. 16, 1992

Related U.S. Application Data

[63] Continuation of Ser. No. 433,349, Nov. 8, 1989, abandoned.

[30] Foreign Application Priority Data

| Nov. 9, 1988 | [JP] | Japan | 63-281456 |
| Nov. 22, 1988 | [JP] | Japan | 63-296731 |
| Nov. 22, 1988 | [JP] | Japan | 63-296733 |
| Nov. 22, 1988 | [JP] | Japan | 63-296734 |

[51] Int. Cl.$^5$ .............................. H04N 9/67
[52] U.S. Cl. ............................ 358/41; 358/30
[58] Field of Search ............ 358/41, 30, 48, 44, 358/43

[56] References Cited

U.S. PATENT DOCUMENTS

| 4,631,578 | 12/1986 | Sasaki et al. |
| 4,682,210 | 7/1987 | Ikemura et al. |
| 4,688,085 | 8/1987 | Imaide ................... 358/30 X |
| 4,700,219 | 10/1987 | Tanaka et al. |
| 4,716,455 | 12/1987 | Ozawa et al. |
| 4,768,084 | 8/1988 | Noda et al. |
| 4,941,037 | 7/1990 | Sasaki ...................... 358/80 |
| 4,945,406 | 7/1990 | Cok .......................... 358/80 |
| 4,975,769 | 12/1990 | Aieu et al. ................ 358/80 |

FOREIGN PATENT DOCUMENTS

| 0262623 | 4/1988 | European Pat. Off. |
| 2014821 | 8/1979 | United Kingdom |
| 2196507 | 4/1988 | United Kingdom |

Primary Examiner—James J. Groody
Assistant Examiner—Mark R. Powell
Attorney, Agent, or Firm—Fitzpatrick, Cella, Harper & Scinto

[57] ABSTRACT

Disclosed is a color signal processing apparatus in which at least three types of color signals corresponding to filters are received from a solid-state image pickup element on which at least three types of color filters are formed, and linear matrix conversion of the at least three types of color signals determined by spectral characteristics of the corresponding color filters is performed to generate R, G, and B signals.

9 Claims, 13 Drawing Sheets

FIG. 1A

| Mg | Gr | Ye | Cy | |
| Gr | Mg | Cy | Ye | |
| Mg | Gr | Ye | Cy | |
| Gr | Mg | Cy | Ye | |

FIG. 1B

| Ⓐ | x | x | x | Ⓔ | x |
| x | Ⓑ | x | x | x | Ⓕ |
| Ⓒ | x | x | x | Ⓖ | x |
| x | Ⓓ | x | x | x | Ⓗ |

FIG. 8
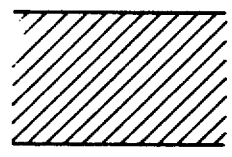
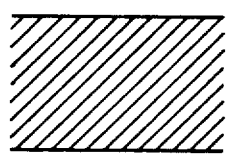
| Mg | Gr | Mg | Gr | | n |
|----|----|----|----|---|---|
| Gr | Mg | Gr | Mg | | |
| Ye | Cy | Ye | Cy | | n+1 |
| Cy | Ye | Cy | Ye | | |
| Mg | Gr | Mg | Gr | | n+2 |
| | | | | | |

COLOR SIGNAL PROCESSING APPARATUS USING PLURAL LUMINANCE SIGNALS

This application is a continuation-in-part continuation of application Ser. No. 07/433,349 filed Nov. 8, 1989, now abandoned.

BACKGROUND OF THE INVENTION

1. Field of the Invention

The present invention relates to a color signal processing apparatus for a single-plate type color video camera having a complementary color filter or a color still video camera.

2. Related Background Art

Conventionally, in an apparatus of this type, color filters shown in FIG. 1A are attached to a solid-state image pickup element, and signal processing shown in FIG. 2 is performed, thus finally obtaining a luminance signal and two color difference signals R-Y and B-Y.

In conventional color signal processing, calculation processing is normally started from color difference signals as a result of subtracting outputs from horizontally adjacent pixels with different color filters. For example, if the color filter matrix shown in FIG. 1A is interlace-scanned in a frame storage mode, video signals obtained from a sensor 1 are subjected to $\gamma$ correction in a $\gamma$ correction circuit 2, and are then processed by a luminance signal processing circuit 3, thus extracting a luminance signal Y. In an odd-numbered column of each field, a subtraction result of $C_1 = (Mg - Gr)$ is obtained by a subtracter 4, and in an even-numbered column, a subtraction result of $C_2 = (Ye - Cy)$ is obtained. Meanwhile, a color signal processing circuit 5 performs color processing calculations for, e.g., white balance, $\gamma$ conversion, and the like by a proper method.

A coincidence circuit 6 causes these line-sequential color difference signals $C_1/C_2$ to coincide with each other using a 1h (horizontal scanning period) delay line or the like. These signals are then input to a color difference matrix circuit 7, so that their color difference axes are appropriately rotated, thus finally obtaining two color difference signals R-Y and B-Y.

However, the color processing method of this type has the following fundamental problems.

(A) A white balance is difficult to obtain.

In a three-tube type camera or an RGB primary color (pure color) type camera, ratios of R and B to G are changed in accordance with a change in color temperature, thus obtaining a white balance. However, in the apparatus of this type, since color data is obtained in the form of a color difference, a fraction of a luminance signal is added/subtracted to/from a color difference signal in accordance with a color temperature to forcibly set a color difference signal for white to zero, thereby obtaining a white balance. With this method, it is very difficult to accurately obtain a white balance over a wide color temperature range.

(B) Since the color difference signals are directly subjected to $\gamma$-conversion, color reproducibility is poor.

In a three-tube type camera or an RGB primary color type camera, outputs R, G, and B which are color-separated in accordance with an NTSC scheme are multiplied with $\gamma$ to obtain R$\gamma$, G$\gamma$, and B$\gamma$. Thereafter, two color difference signals R$\gamma$-Y and B$\gamma$-Y are obtained. In this case, Y (luminance signal) is given by $Y = 0.30 R\gamma + 0.59 G\gamma + 0.11 B\gamma$.

In a complementary color type camera, however, since differences between color signals are first calculated and then multiplied with $\gamma$, they are multiplied with $\gamma$ in the form of a difference like (Mg-Gr)$\gamma$. Therefore, if any correction is made later, color signals having a correspondence with normal NTSC signals cannot be obtained, and color reproducibility is poor.

In order to solve the above problems, for example, as shown in FIG. 3, two color difference signals $C_1$ and $C_2$ obtained through a subtracter 8 and a coincidence circuit 9 are converted to R, G, and B signals using a luminance signal $Y_L'$ passing through a low-pass filter 10 by an appropriate calculation in an RGB conversion unit 11. In this state, the R, G, and 8 signals are subjected to white balance processing and $\gamma$ conversion by a white balance circuit 12 and a $\gamma$ conversion unit 13, respectively. Thereafter, the R, G, and B signals are converted again to a luminance signal $Y_L$ and color difference signals R-Y and B-Y by a color difference matrix circuit 14.

With this method, since white balance processing and conversion can be performed in the form of R, G, and B signals, the above-mentioned problems in FIG. 2 can be eliminated. The luminance signal is extracted such that a high-frequency luminance signal $Y_H$ is extracted from the output of a sensor 1 using a high-pass filter 15, and a low-frequency luminance signal is added thereto by an adder 16.

However, in a method wherein after color difference signals of horizontal output differences are formed, and color processing is performed based on these signals, optimal color processing matching with spectral sensitivity of filters cannot be performed, and color reproducibility cannot be improved.

SUMMARY OF THE INVENTION

It is an object of the present invention to provide a color signal processing apparatus which can solve the conventional problems, and can greatly improve color reproducibility.

It is another object of the present invention to prevent generation of a false color at a vertical edge portion.

According to an aspect of the present invention, an apparatus receives, from a solid-state image pickup element having three or more types of color filters, three or more types of color signals corresponding to the filters, and performs linear matrix conversion, determined based on spectral characteristics of the corresponding color filters, of the three or more types of signals, thereby generating R, G, and B signals.

According to this aspect, since the three primary color signals, i.e., R, G, and B signals are generated using all the color signals corresponding to the color filters formed on the solid-state image pickup element, color reproducibility can be improved.

According to another aspect of the present invention, an apparatus comprises an image pickup means from which two different color signals are repetitively read in a first horizontal scanning period, and other two color signals are repetitively read in a second horizontal scanning period, an adjusting means for adjusting to equalize responses of two color signals on the same scanning line in the first and second horizontal scanning periods with respect to an achromatic color, and a matrix calculation means, in which sums of coefficients in two right columns in each row of a 3 (rows)×4 (columns) matrix are equal to each other, and sums of coefficients in two left columns in each row of the matrix are equal to each other, for converting the signals adjusted by the adjusting means into R, G, and B signals.

According to still another aspect of the present invention, an apparatus comprises an image pickup means from which two different first and second color signals are repetitively read in a first horizontal scanning period and two third and fourth color signals different from the first and second color signals are repetitively read in a second horizontal scanning period, an adjusting means for adjusting to equalize responses of two color signals on the same scanning line in the first and second horizontal scanning periods with respect to an achromatic color, a first addition means for calculating a sum of the first and second color signals of the color signals adjusted by the adjusting means, a second addition means for calculating a sum of the third and fourth signals of the color signals adjusted by the adjusting means, a first subtraction means for calculating a difference between the first and second color signals of the color signals adjusted by the adjusting means, a second subtraction means for calculating a difference between the third and fourth color signals of the color signals adjusted by the adjusting means, a third addition means for adding products obtained by multiplying the outputs from the first and second addition means with constants, respectvely, and a calculation means for adding an output from the third addition means to products obtained by multiplying the outputs from the first and second subtraction means with constants, respectively, so as to form R, G, and B signals.

According to the above aspects, the calculation means for forming the R, G, and B signals can be arranged so that (4×3) matrix calculations can be very efficiently performed by only 8 multiplications and 11 additions/subtractions while the conventional apparatus requires 12 multiplications and 9 additions/subtractions, and generation of a vertical false color can be minimized.

According to still another aspect of the present invention, calculations determined on the basis of a color temperature of an object and spectral characteristics of filters are performed for output signals from a camera having complementary color filters, thereby generating R, G, and B signals.

According to this aspect, color reproducibility can be greatly improved, and since calculations for RGB conversion are changed in accordance with a color temperature, a vertical false color signal can be prevented.

According to still another aspect of the present invention, an apparatus comprises color filters which are repetitively arranged in patterns each including a total of four colors (two colors in a horizontal direction and two colors in a vertical direction), an image pickup means for picking up an image through the color filters, an adjusting means for adjusting to equalize color signals of adjacent pixels on odd- and even-numbered horizontal scanning lines with respect to an achromatic object, a first matrix calculation means, in which sums of coefficients in two right columns in each row of a 3 (rows)×4 (columns) matrix are equal to each other, and sums of coefficients in two left columns in each row are equal to each other, for performing a matrix calculation of the signals adjusted by the adjusting means, a 3 (rows)×4 (columns) second matrix calculation means in which a matrix has coefficients calculated by a method of least squares in order to represent reference spectral characteristics $r(\lambda)$, $g(\lambda)$, and $b(\lambda)$ of R, G, and B signals by linearly coupled spectral characteristics $f_1(\lambda)$, ..., $f_4(\lambda)$ of the four color filters, and a control means for changing an output ratio of the first or second matrix calculation means in accordance with a level of a vertical high-frequency component of the output signal of the image pickup means, thereby forming R, G, and B signals.

According to this aspect, merits and demerits of the two types of matrix calculations are optimally combined. When an output signal of an image pickup element includes many vertical high-frequency components and a false color tends to be easily generated, the first matrix calculation means is mainly used. When the output signal includes a small number of vertical high-frequency components and a false color tends not to be generated, the second matrix calculation means with good color reproducibility is mainly used. Therefore, a color signal processing apparatus which has good color reproducibility and is free from a false color can be obtained.

The above and other objects and features of the present invention will be apparent from the following description taken in conjunction with the accompanying drawings.

DESCRIPTION OF THE DRAWINGS:

FIGS. 1A and 1B are views showing a color filter matrix;

FIGS. 7A to 7C are views showing a color filter matrix different from that shown in FIGS. 1A and 1B;

FIG. 8 is a view for explaining generation of a vertical false color;

FIG. 14 is a block diagram showing a vertical high-pass filter in the signal processing apparatus shown in FIG. 13.

DETAILED DESCRIPTION OF THE PREFERRED EMBODIMENTS

Figure 2:
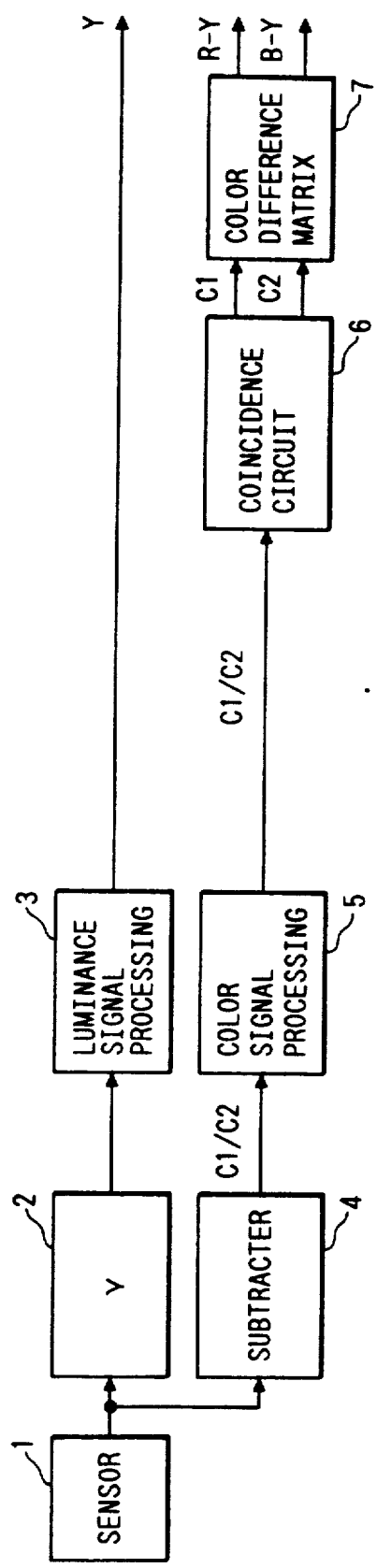
FIG. 2 is a block diagram of a conventional apparatus.

Preferred embodiments of the present invention will be described in detail below with reference to the accompanying drawings.

Prior to the description of the embodiment, the basic principle for obtaining optimal color reproducibility will be explained below.

In the NTSC scheme, ideal spectral characteristics for three primary colors R, G, and B are determined, and are represented by $r(\lambda)$, $g(\lambda)$, and $b(\lambda)$. On the other hand, spectral characteristics of outputs Mg, Gr, Cy, and Ye obtained when a sensor shown in FIG. 1(a) is used are represented by Mg(λ), Gr(λ), Cy(λ) and Ye(λ), respectively.

In this case, if a certain function F can satisfy:

$$\begin{bmatrix} r(\lambda) \\ g(\lambda) \\ b(\lambda) \end{bmatrix} = F \begin{bmatrix} Mg(\lambda) \\ Gr(\lambda) \\ Cy(\lambda) \\ Ye(\lambda) \end{bmatrix} \quad (1)$$

ideal NTSC R, G, and B signals can be obtained when the sensor outputs Mg, Gr, Cy, and Ye are subjected to the same function F.

$$\begin{bmatrix} R \\ G \\ B \end{bmatrix} = F \begin{bmatrix} Mg \\ Gr \\ Cy \\ Ye \end{bmatrix} \quad (2)$$

In practice, since it is difficult to establish equation (1) for all the wavelengths λ, it is considered that F is approximated by a (3×4) linear matrix $A = (a_{ij})$. Spectral characteristics of results converted by A are represented by r'(λ), g'(λ), and b'(λ). That is, $$\begin{bmatrix} r'(\lambda) \\ g'(\lambda) \\ b'(\lambda) \end{bmatrix} = A \begin{bmatrix} Mg(\lambda) \\ Gr(\lambda) \\ Cy(\lambda) \\ Ye(\lambda) \end{bmatrix} \quad (3)$$

An error function E is defined as follows:

$$E(A) = \sum_{i=1}^{N} [r(\lambda_i) - r'(\lambda_i)]^2 + [g(\lambda_i) - g'(\lambda_i)]^2 + [b(\lambda_i) - b'(\lambda_i)]^2 \quad (4)$$

where N is an integer, and in general, 300 nm $< \lambda_1, \lambda_2, \ldots, \lambda_n <$ 800 nm.

A for minimizing E(A) can be determined. That is, $$\frac{\partial E(A)}{\partial a_{ij}} = 0 \quad \begin{pmatrix} 1 \leq i \leq 4 \\ 1 \leq j \leq 3 \end{pmatrix} \quad (5)$$

Equation (5) becomes a linear equation with 12 unknowns in the form of a so-called normal equation. Therefore, equation (5) can be solved to determined ($a_{ij}$), and F can be satisfactorily approximated using the determined ($a_{ij}$). Of course, a method of selecting the error function E is not limited to this, and a wavelength $\lambda_i$ or r, g, and b may be approximately weighted. Using A thus determined, the sensor outputs (Mg, Gr, Cy, and Ye) are converted as follows:

$$\begin{bmatrix} R \\ G \\ B \end{bmatrix} = A \begin{bmatrix} Mg \\ Gr \\ Cy \\ Ye \end{bmatrix} \quad (6)$$

Thus, necessary color processing such as γ conversion, white balance processing, and the like can be performed based on the resultant R, G, and B signals. Finally, the following conversion suitable for the NTSC standards is performed to obtain desired luminance and color difference signals:

$$\begin{bmatrix} Y_L \\ R - Y_L \\ B - Y_B \end{bmatrix} = \begin{bmatrix} 0.30 & 0.59 & 0.11 \\ 0.70 & -0.59 & -0.11 \\ -0.30 & -0.59 & 0.89 \end{bmatrix} \begin{bmatrix} R\gamma \\ G\gamma \\ B\gamma \end{bmatrix} \quad (7)$$

where Rγ, Gγ, and Bγ are signals obtained by approximately γ-converting white-balanced R, G, and B signals with γ=0.45.

Figure 3:
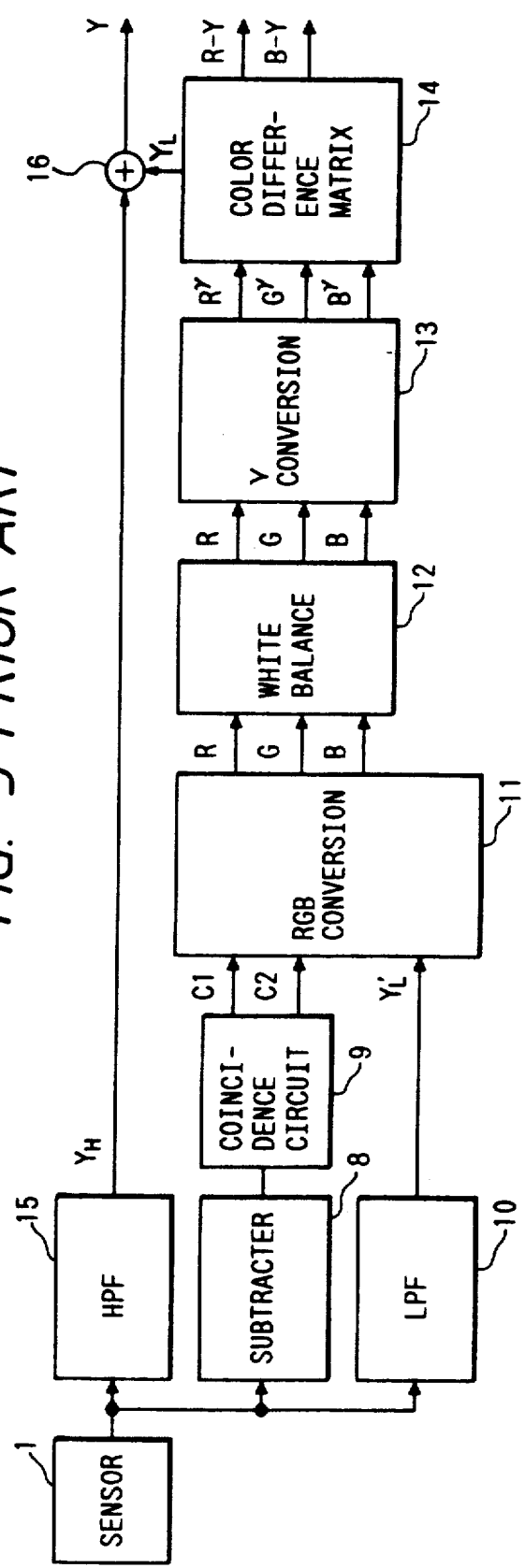
FIG. 3 is a block diagram of another conventional apparatus.

A case will be considered wherein color difference signals $C_1$ and $C_2$ are formed based on differences between horizontally adjacent pixels and color processing is performed based on these signals like in the prior art shown in FIG. 3.

In the case of the color matrix shown in FIG. 1(a), the two color difference signals $C_1$ and $C_2$ are respectively given by:

$$C_1 = Mg - Gr$$

$$C_2 = Cy - Ye \quad (8)$$

On the other hand, since a low-frequency component $Y_L'$ of a luminance signal is formed by appropriately weighting and averaging Mg, Gr, Cy, and Ye, $Y_L'$ can be written as:

$$Y_L' = k_1 Mg + k_2 Gr + k_3 Cy + k_4 Ye \quad (9)$$

In this case, an RGB conversion unit 406 converts $C_1$, $C_2$, and $Y_L'$ into R, G, and B signals using a (3×3) matrix B as follows:

$$\begin{pmatrix} R \\ G \\ B \end{pmatrix} = B \begin{pmatrix} C_1 \\ C_2 \\ Y_L' \end{pmatrix} \quad (10)$$

When equations (8), (9), and (10) are summarized, $$\begin{pmatrix} R \\ G \\ B \end{pmatrix} = BM \begin{bmatrix} Mg \\ Gr \\ Cy \\ Ye \end{bmatrix} \quad (11)$$

for $$M = \begin{pmatrix} 1 & -1 & 0 & 0 \\ 0 & 0 & 1 & -1 \\ k_1 & k_2 & k_3 & k_4 \end{pmatrix} \quad (12)$$

Upon comparison between equations (11) and (6), there is no problem if B can be determined to always establish BM=A, but it is impossible due to the following reason. Since an operation for calculating a difference in the horizontal direction is performed first, the number of dimensions of color data is reduced from 4 to 3, i.e., from (Mg, Cy, Ye, Gr) to ($Y_L'$, $C_1$, $C_2$) at this time. Since equation (6) is optimized for color reproduction within a linear range, color reproducibility is improved better than that determined by equation (11) in the prior art.

In this manner, according to the present invention, all the color signals Mg, Gr, Cy, and Ye from the solid-state image pickup element are used to generate the R, G, and B signals, thus improving color reproducibility.

Embodiments of the present invention will be described below.

First Embodiment

Figure 4:
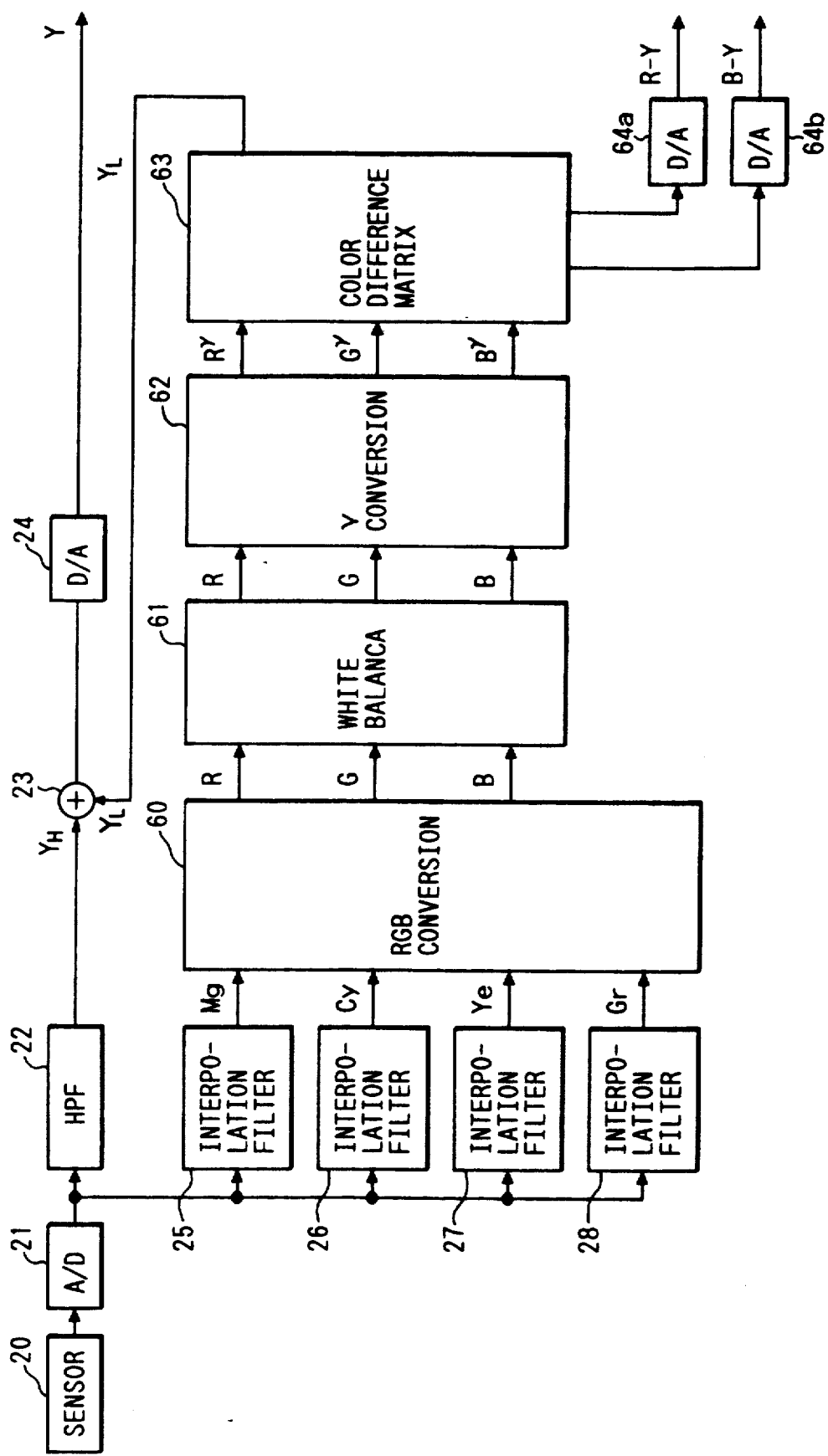
FIG. 4 is a block diagram of a first embodiment of the present invention.

FIG. 4 shows an embodiment when a CCD having color filters shown in FIG. 1A is interlace-scanned.

In this case, four color signals Mg, Gr, Cy, and Ye must be caused to coincide with each other. This is because these four data are converted to color signals R, G, and B by calculations.

If a sensor has an arrangement capable of simultaneously reading out four lines like a MOS sensor, this can be executed without posing a problem. However, in a sensor which is impossible to do it like a CCD, the color signals must be two-dimensionally interpolated to be caused to coincide with each other.

For example, when Mg is considered in the case of sensor outputs shown in FIG. 1A, its sampling position corresponds to a position indicated by a mark "o" in FIG. 1B. Other positions indicated by a mark "x" have other color data but have no Mg color data. Therefore, these positions are interpolated by appropriately weighting data indicated by the mark "o" (e.g., A to H). This is a coinciding operation by a two-dimensional interpolation filter. This operation is performed for each color.

In consideration of the above principle, a description will be made below with reference to FIG. 4.

In a CCD sensor 20, four types of color filters are arranged, as shown in FIG. 1A. A video signal read from the sensor 20 by interlaced scanning in units of pixels is A/D-converted by an A/D converter 21 at a timing synchronous with a read clock. For color processing to be performed later, the A/D converter 21 preferably performs A/D conversion of 8 or more bits from the viewpoints of good linear characteristics and a quantization error.

A luminance signal is output as follows. That is, a high-frequency component is detected by a high-pass filter 22, and is added to a low-frequency component $Y_L$ obtained by a method to be described later in an adder 23. The sum signal is D/A-converted by a D/A converter 24, thus outputting the luminance signal.

Figure 5:
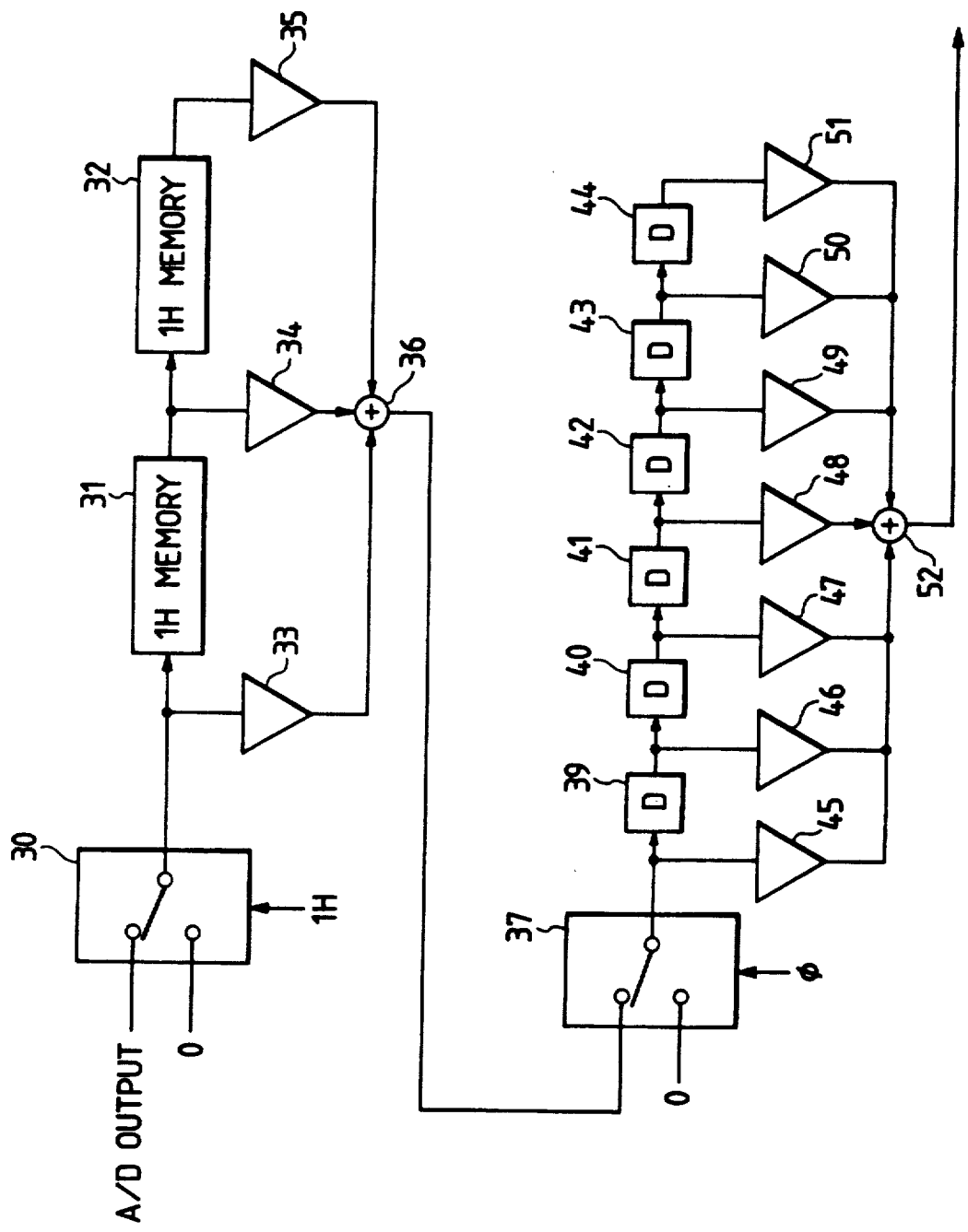
FIG. 5 is a block diagram of an interpolation filter.

The output from the A/D converter 21 is input to four interpolation filters 25, 26, 27, and 28. Each of these four interpolation filters has an arrangement as shown in FIG. 5, and outputs of these filters become coincided color signals Mg, Cy, Ye, and Gr. The operation of the interpolation filter shown in FIG. 5 will be described below.

Assuming that the output from the sensor 20 is obtained by interlaced scanning, the output from the A/D converter 21 is switched between an output of an (Mg/Gr) line and an output of a (Cy/Ye) line for every 1H. Therefore, in, e.g., an Mg interpolation filter, a switch 30 selects the output from the A/D converter while the (Mg/Gr) line is scanned, and selects zero in the next 1H. Thus, the switch 30 alternately outputs data of the (Mg/Gr) line and zero of 1H for every 1H.

1H memories 31 and 32, coefficient multipliers 33, 34, and 35, and an adder 36 form a vertical interpolation filter. For example, if the coefficients in the multipliers 33 and 35 are set to be ¼ and the coefficient of the multiplier 34 is set to be 1, an average value of data of the present (Mg/Gr) line and the immediately preceding and subsequent (Mg/Gr) lines appears at the output of the adder 36 for every 1H, thus achieving vertical interpolation.

Next, the output from the adder 36 is input to a switch 37. Since Mg and Gr signals alternately appear at the input of the switch 37 in synchronism with a read clock $\phi$ for each pixel, the switch 37 selects the output from the adder 36 for the Mg signal, and selects zero for the Gr signal, and outputs the selected signal. The output from the switch 37 is input to a horizontal interpolation filter comprising delays 38 to 44, coefficient multipliers 45 to 51, and an adder 52, and is horizontally interpolated. The coefficients of the coefficient multipliers 45 to 51 are preferably set so that the sum of all the coefficients becomes 2 like (¼, 2/8, ½, ½, ½, 2/8, and ¼).

The Mg interpolation filter 25 has been described. However, when the selection at the switch 37 is reversed, the Gr interpolation filter 28 can be constituted, and when the selection at the switch 30 is reversed, the Cy or Ye interpolation filter 26 or 27 can be constituted in accordance with the phase of the switch 37.

In the above description, an interpolation filter of (¼, 1, ¼) is constituted by two 1H memories. However, N 1H memories may be used to constitute a vertical FIR type digital filter having (N+1) taps. Alternatively, in order to effectively use 1H memories, an IIR filter may be used. With this arrangement, a vertical color band is preferable. Such an arrangement is difficult to attain by analog processing, and is preferably realized by digital processing.

Figure 6:
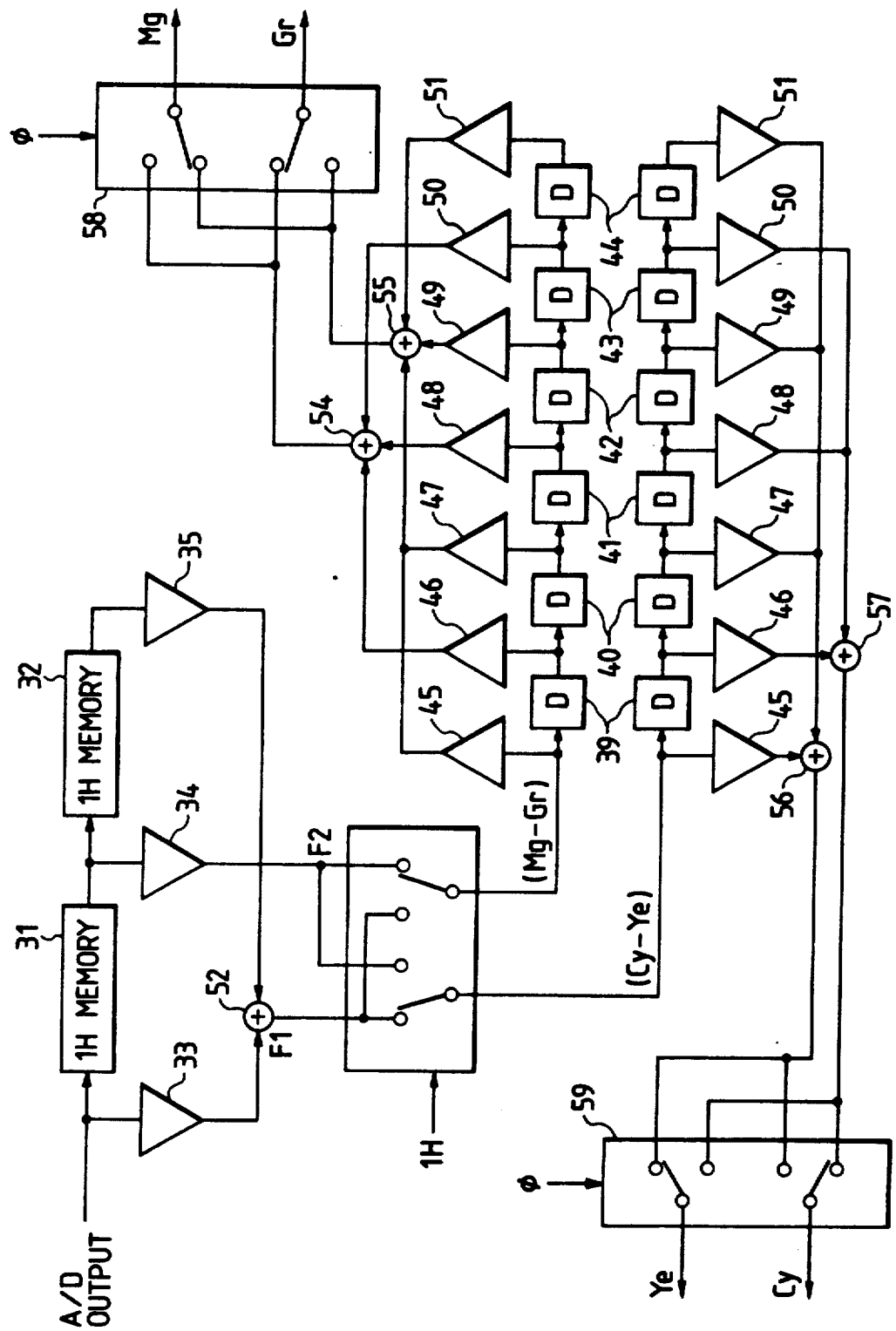
FIG. 6 is a block diagram of another interpolation filter.

In the above description, the four interpolation filters 25 to 28 are independently arranged. When these filters are arranged in one unit as shown in FIG. 6, 1H memories, adders, and coefficient multipliers can be commonly used. Thus, the circuit scale can be greatly reduced.

In FIG. 6, the output from the A/D converter 21 is input to the same vertical interpolation filter comprising the 1H memories 31 and 32 and the coefficient multipliers 33, 34, and 35 as in FIG. 5. At the output of the adder 52, an average value of immediately preceding and subsequent lines appears for every 1H. Assuming that the output from the coefficient multiplier 34 represents an (Mg/Gr) line, an output (F1) of the adder 52 represents an average value of the immediately preceding and subsequent (Cy/Ye) lines. In the next line, since the output of the multiplier 34 corresponds to a (Cy/Ye) line, signals obtained by interpolating the (Mg/Gr) and (Cy/Ye) lines alternately appear at the output F1 for every 1H. At an output (F2) of the coefficient multiplier 34, signals of (Cy/Ye) and (Mg/Gr) lines alternately appear for every 1H. Therefore, a switch 53 selects the outputs F1 and F2 for every 1H, thus extracting interpolation signals (Mg/Gr) and (Cy/Ye) which are caused to coincide with each other in the vertical direction.

The signal of the (Mg/Gr) or (Cy/Ye) line is input to the same horizontal interpolation filter comprising the delays 39 to 44 and the coefficient multipliers 45 to 51 as in FIG. 5. Since each of adders 54, 55, 56, and 57 adds outputs at every two taps, interpolated outputs of Mg and Gr alternately appear at, e.g., the outputs of the adders 54 and 55 for every clock $\phi$. Therefore, when the outputs of the adders 54 and 55 are switched by a switch 58 for every clock $\phi$, two-dimensionally interpolated Mg and Gr signals can be obtained. Similarly, Cy and Ye signals can be obtained from a switch 59.

When coincided Mg, Cy, Ye, and Gr signals can be obtained in FIG. 4, all the following calculation processing need only be performed once per several read clocks for each pixel. This is because a band of a color signal is generally narrow. Therefore, after the interpolation filters, thinning processing is performed so that the following calculation processing is performed at a relatively low speed. Thus, power consumption can be greatly reduced.

An RGB conversion unit 60 shown in FIG. 4 will be described below.

As described above, spectral characteristics $Mg(\lambda)$, $Gr(\lambda)$, $Cy(\lambda)$, and $Ye(\lambda)$ of the signals Mg, Gr, Cy, and Ye were measured within the range of 380 nm to 780 nm at 10-nm intervals, thus obtaining $Mg(\lambda i)$, $Gr(\lambda i)$, $Cy(\lambda i)$, and $Ye(\lambda i)$ ($i = 1, \ldots, 41$).

Then, NTSC RGB ideal spectral characteristics $r(\lambda i)$, $g(\lambda i)$, and $b(\lambda i)$ were cited from "Handbook of Theory of Colors" (Tokyo University Press (1981)), and equally weighted normal equations were solved according to equation (5), thus obtaining the following optimal matrix A. Of course, spectral characteristics of existing R, G, and B filters may be measured to obtain reference characteristics $r(\lambda i)$, $g(\lambda i)$, and $b(\lambda i)$.

$$A = \begin{bmatrix} 0 & -0.74 & 0 & 1 \\ -0.02 & 0.4 & -0.09 & 0.05 \\ -0.37 & -0.53 & 0.71 & 0.25 \end{bmatrix} \begin{bmatrix} Mg \\ Gr \\ Cy \\ Ye \end{bmatrix}$$

This matrix is approximated to A' as follows so that shift operations up to three stages and addition are executed by a digital fixed multiplier.

$$A' = \begin{bmatrix} 0 & -(2^{-1} + 2^{-2}) & 0 & 1 \\ -(2^{-5}) & (2^{-2} + 2^{-3} + 2^{-4}) & -(2^{-3}) & 2^{-4} \\ -(2^{-2} + 2^{-3}) & -2^{-2} & (2^{-1} + 2^{-2}) & 2^{-2} \end{bmatrix}$$

Of course, the normal equation may be formed by weighting $\lambda i$ to obtain A.

In this embodiment, the fixed multiplier is used. However, the above opeartion may be realized by table conversion.

Next, a white balance unit 61 converts R, G, and B signals into $\alpha R$, G, and $\beta B$, thus obtaining a white balance. Multipliers in the RGB covnersion unti 60 may comprise variable multipliers, and the followin matrix may be adopted in palce of the matrix A" to commonize RGB conversion and white balance processing:

$$A' = \begin{bmatrix} \alpha a_{11} & \alpha a_{12} & \alpha a_{13} & \alpha a_{14} \\ a_{21} & a_{22} & a_{23} & a_{24} \\ \beta a_{31} & \beta a_{32} & \beta a_{33} & \beta a_{34} \end{bmatrix}$$

In a $\gamma$ conversion unit 62, the R, G, and B signals are $\gamma$-converted by table conversion. In a color difference matrix unit 63, matrix calculations are performed according to equation (7). Since integer type fixed multiplications are performed in this unit, coefficients are preferably approximated to additions/subtractions of some powers of 2.

Color difference signals generated by the calculations are converted into analog signals by D/A converters 64a and 64b, and the analog signals are output.

Second Embodiment

When interlaced read access is performed in a field storage mode using a color filter matrix shown in FIG. 7(a), the present invention is effective, and an embodiment in this case will be described below.

In an odd-numbered line in each field, (Mg+Cy) and (Gr+Ye) are alternately output in a horizontal direction, and in an even-numbered line, (Mg+Ye) and (Gr+Cy) are alternately output. Therefore, since four different color signals $C_1 = (Mg + Cy)$, $C_2 = (Gr + Ye)$, $C_3 = (Mg + Ye)$, and $C_4 = (Gr + Cy)$ are spatially sampled, these signals can be converted to R, G, and B signals by calculations optimized in correspondence with spectral characteristics of color filters after a coinciding operation by two-dimensional interpolation filtering.

In this matrix, an interlaced or non-interlaced read access result in the frame storage mode may be temporarily A/D-converted and is stored in a frame memory, and the similar processing may be performed while reading out data from the frame memory. In this case, since a vertical correlation distance can be shortened, it is effective to eliminate a vertical false color.

Third Embodiment

Figures 7A, 7B, 7C:
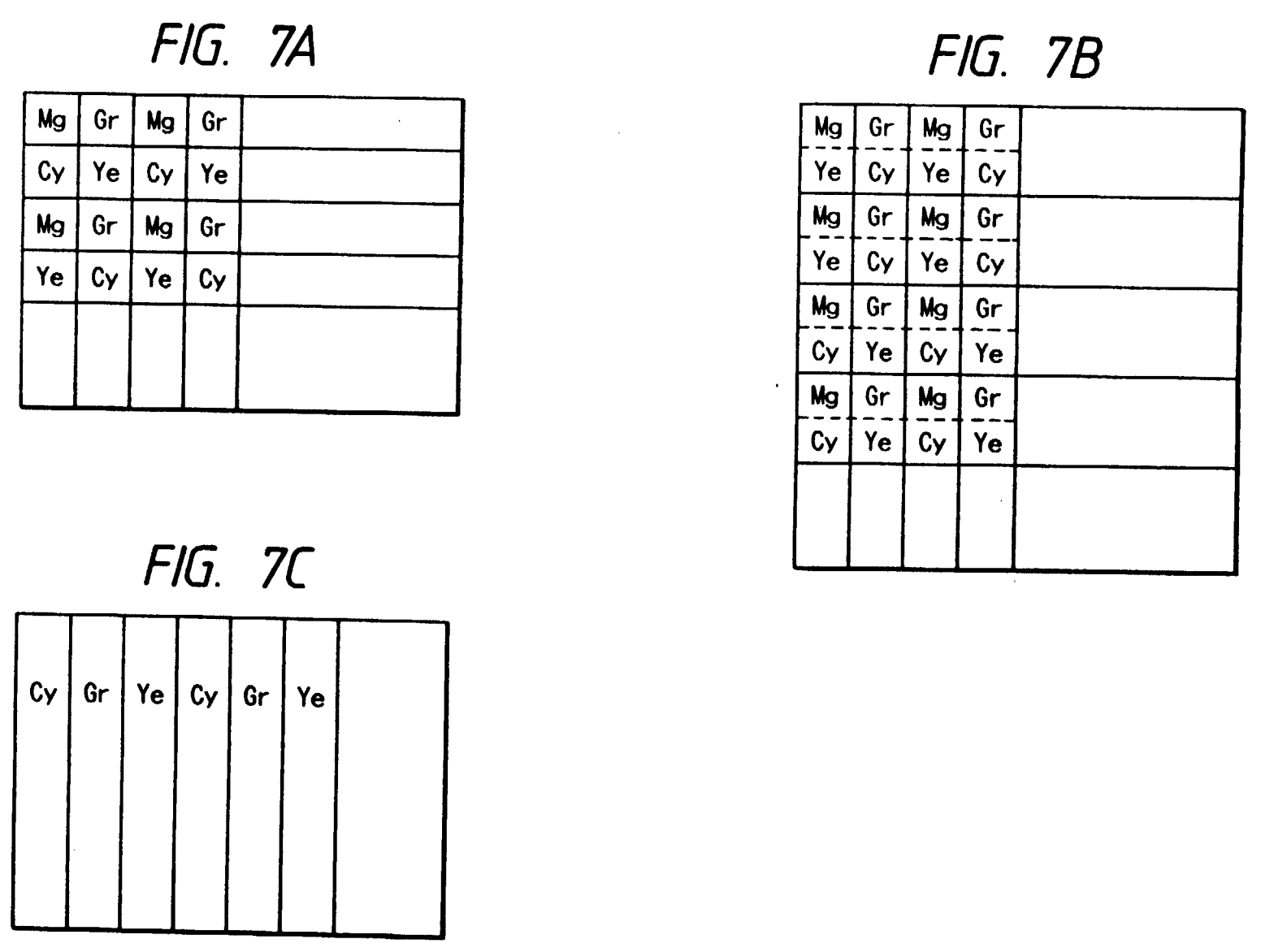

In a still video camera in which two different color filters are formed on one pixel, as shown in FIG. 7(b), and pixel data are stored in units of frames and are read out by interlaced scanning, a sensor capable of performing frame photographing is proposed. In this case, since two color signals $C_1 = (Mg + Ye)$ and $C_2 = (Gr + Cy)$ are obtained from an odd-numbered line and two color signals $C_3 = (Mg + Cy)$ and $C_4 = (Gr + Ye)$ are obtained from an even-numbered line, the present invention is effectively applied as in the first and second embodiments.

Fourth Embodiment

For a sensor in which complementary color filters are aligned in a stripe manner, the present invention is effective.

In this case, no vertical interpolation is necessary. However, when interpolation, i.e., low-pass filtering is performed in a vertical direction, an S/N ratio of each color can be preferably increased. In a horizontal direction, interpolation is performed using an interpolation filter as in the above embodiments. An RGB conversion matrix in this case is a (3×3) matrix.

As described above, according to the present invention, since R, G, and B signals are generated using all the color signals corresponding to color filters attached to the solid-state image pickup element, correct white balance processing and $\gamma$ conversion can be performed, and color reproducibility can be greatly improved. Still another embodiment of the present invention will be described below. In this embodiment, a false color reproduced at a vertical edge portion in the above embodiments is suppressed while good color reproducibility is maintained.

Fifth Embodiment

Prior to description of the fifth embodiment of the present invention, a cause of reproduction of a false color at a vertical edge will be examined, and a condition for preventing it will then be examined.

When a color filter matrix shown in FIG. 1(a) is used in the arrangement shown in FIG. 4, color signals are converted to R, G, and B signals by calculations using the following (3×4) linear matrix.

$$\begin{bmatrix} R \\ G \\ B \end{bmatrix} = [a_{ij}] \begin{bmatrix} Mg \\ Gr \\ Cy \\ Ye \end{bmatrix} \quad (12)$$

Mg, Gr, Cy, and Ye in the right-hand side of equation (12) are caused to coincide with each other by the two-dimensional interpolation filters 25 to 28 shown in FIG. 4.

It is assumed that a black-and-white halftone pattern having a vertical cycle just corresponding to four pixels is an object.

it is further assume that parameters $\alpha$ and $\beta$ determined by a color temperature are determined in advance for an achromatic color to satisfy the following equations:

$$Mg = \alpha Gr$$

$$Cy = \beta Ye \quad (13)$$

In this case, since the positions of Mg and Gr just coincide with a dark portion and positions of Cy and Ye just coincide with a bright portion, the following relations can be established with any interpolation filters:

$$Mg = \alpha Gr = V_1$$

$$Cy = \beta Ye = V_2 \quad (14)$$

where $V_1$ and $V_2$ are pixel signal outputs as a function of brightness, and in FIG. 4, $V_1 < V_2$.

Therefore, from equations (12), (13), and (14), $$R = (a_{11} + a_{12}/\alpha)V_1 + (a_{13} + a_{14}/\beta)V_2$$

$$G = (a_{21} + a_{22}/\alpha)V_1 + (a_{23} + a_{24}/\beta)V_2$$

$$B = (a_{31} + a_{32}/\alpha)V_1 + (a_{33} + a_{34}/\beta)V_2$$

Since this halftone pattern of the object is originally a black-and-white object, since a false color is not reproduced for all $V_1$ and $V_2$, the following two conditions must be simultaneously established:

$$a_{11} + \left(\frac{a_{12}}{\alpha}\right) = a_{21} + \left(\frac{a_{22}}{\alpha}\right) = a_{31} + \left(\frac{a_{32}}{\alpha}\right) \quad (16)$$

$$a_{13} + \left(\frac{a_{14}}{\beta}\right) = a_{23} + \left(\frac{a_{24}}{\beta}\right) = a_{33} + \left(\frac{a_{34}}{\beta}\right) \quad (17)$$

Assuming that a product of a Gr output multiplied with $\alpha$ and a product of a Cy output multiplied with $\beta$ are respectively represented by Gr' and Ye', color signals are converted based on the following equation in place of equation (12):

$$\begin{bmatrix} R \\ G \\ B \end{bmatrix} = [a_{ij}] \begin{bmatrix} Mg \\ Gr' \\ Cy \\ Ye' \end{bmatrix} \quad (18)$$

At this time, the conditions given by equations (16 and 17) are respectively rewritten as:

$$a_{11} + a_{12} = a_{21} + a_{22} = a_{31} + a_{32} \quad (19)$$

$$a_{13} + a_{14} = a_{23} + a_{24} = a_{33} + a_{34} \quad (20)$$

Common portions in equations (19) and (20) are respectively given by 2P and 2Q:

$$a_{11} + a_{12} = a_{21} + a_{22} = a_{31} + a_{32} = 2P \quad (19')$$

$$a_{13} + a_{14} = a_{23} + a_{24} = a_{33} + a_{34} = 2Q \quad (20')$$

if $$a_{11} - a_{12} = 2R_1, a_{13} - a_{14} = 2R_2$$

$$a_{21} - a_{22} = 2G_1, a_{23} - a_{24} = 2G_2$$

$$a_{31} - a_{32} = 2B_1, a_{33} - a_{34} = 2B_2 \quad (21)$$

from equation (18), since R is given by:

$$R = a_{11}Mg + a_{12}Gr' + a_{13}Cy + a_{14}Ye'$$

according to equations (19'), (20'), and (21), $$\begin{aligned} R &= (P + R_1)Mg + (P - R_1)Gr' + (Q + R_2)Cy + (Q - R_2)Ye' \\ &= P(Mg + Gr') + Q(Cy + Ye') + R_1(Mg - Gr') + R_2(Cy - Ye') \end{aligned} \quad (22)$$

Similarly, $$G = P(Mg + Gr') + Q(Cy + Ye') + G_1(Mg - Gr') + G_2(Cy - Ye') \quad (23)$$

$$B = P(Mg + Gr') + Q(Cy + Ye') + B_1(Mg - Gr') + B_2(Cy - Ye-) \quad (24)$$

In general, when 3×4 matrix calculations are performed as in equation (18), 12 (=3×4) multiplications and 9 (=3×3) additions/subtractions are necessary.

However, in this invention, by utilizing the conditions given by equations (16) and (17), R, G, and B signals are calculated as in equations (22), (23), and (24).

As a result, the number of multiplications can be reduced. For example, for R, the following calculations are necessary.

(1) calculations of P(Mg-Gr')+Q(Cy+Ye'): 3 additions/subtractions and two multiplications (2) calculations of $R_1$(Mg-Gr'): 1 addition/subtraction and 1 multiplication (3) calculations of $R_2$(Cy-Ye'): 1 addition/subtraction and 1 multiplication (4) calculations of (1)+(2)+(3): multiplication 2 additions/subtractions Of these calculations, since additions/subtractions in (1) and (2), and (3) can be commonized among colors, the above calculations for all the colors can be executed by:

3+1+1+3×2=11 (additions/subtractions)

2+3×1+3×1=8 (multiplications)

The conditions in equations (16) and (17) are very strong conditions, and the present invention utilizes this feature, so that (4×3) matrix calculations requiring 12 multiplications and 9 additions/subtractions are very efficiently performed by 8 multiplications and 11 additions/subtractions, and reproduction of a vertical false color as a serious problem can be minimized.

Sixth Embodiment

Figure 9:
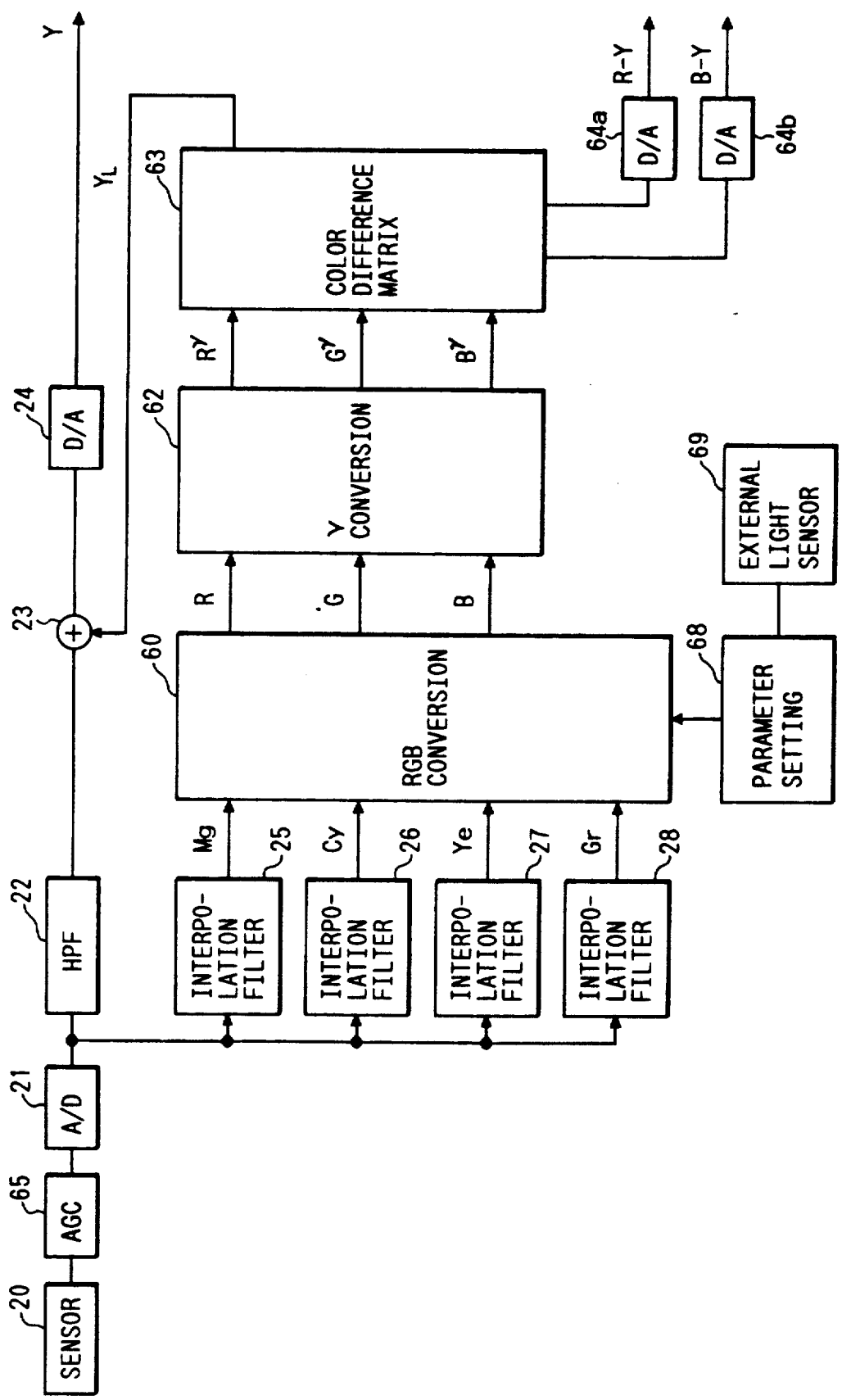
FIG. 9 is a block diagram of a signal processing apparatus of a video camera according to the present invention.

FIG. 9 shows an embodiment when a CCD is interlace-scanned as in FIG. 8. Note that the same reference numerals in this embodiment denote the same parts as in the previous embodiments.

In order to carry out the present invention, four color signals Mg, Gr, Cy, and Ye must be caused to coincide with each other. This is because these four data are converted to R, G, and B signals by calculations.

For example, when Mg is considered in the case of sensor outputs shown in FIG. 1A, its sampling position corresponds to a position indicated by a mark "o" in FIG. 1B. Other positions indicated by a mark "x" have other color data but have no Mg color data. Therefore, these positions are interpolated by appropriately weighting data indicated by the mark "o" (e.g., A to H). This is a coinciding operation by a two-dimensional interpolation filter. This operation is performed for each color.

In consideration of the above principle, a description will be made below with reference to FIG. 9.

In a CCD sensor 20, four types of color filters are arranged, as shown in FIG. 8. A video signal read out from the sensor 20 by interlaced scanning in units of pixels is input to an AGC circuit 65 to be subjected to gain control and is then A/D-converted by an A/D converter 21 at a timing synchronous with a read clock. For color processing to be performed later, the A/D converter 21 preferably performs A/D conversion of 8 or more bits from the viewpoints of good linear characteristics and a quantization error.

A luminance signal is output as follows. That is, a high-frequency component is detected by a high-pass filter 22, and is added to a low-frequency component $Y_L$ obtained by a method to be described later in an adder 23. The sum signal is D/A-converted by a D/A converter 24, thus outputting the luminance signal.

The output from the A/D converter 21 is input to four interpolation filters 25, 26, 27, and 28. Each of these four interpolation filters has an arrangement as shown in FIG. 5 or 6 described above, and outputs of these filters become coincided color signals Mg, Cy, Ye, and Gr, as has been described above.

When coincided Mg, Cy, Ye, and Gr signals can be obtained in FIG. 9, all the following calculation processing need only be performed once per several read clocks for each pixel. This is because a band of a color signal is generally narrow. Therefore, after the interpolation filters, thinning processing is performed so that the following calculation processing is performed at a relatively low speed. Thus, power consumption can be greatly reduced.

An RGB conversion unit as the characteristic feature of the present invention will be described below with reference to FIG. 10.

Figure 10:
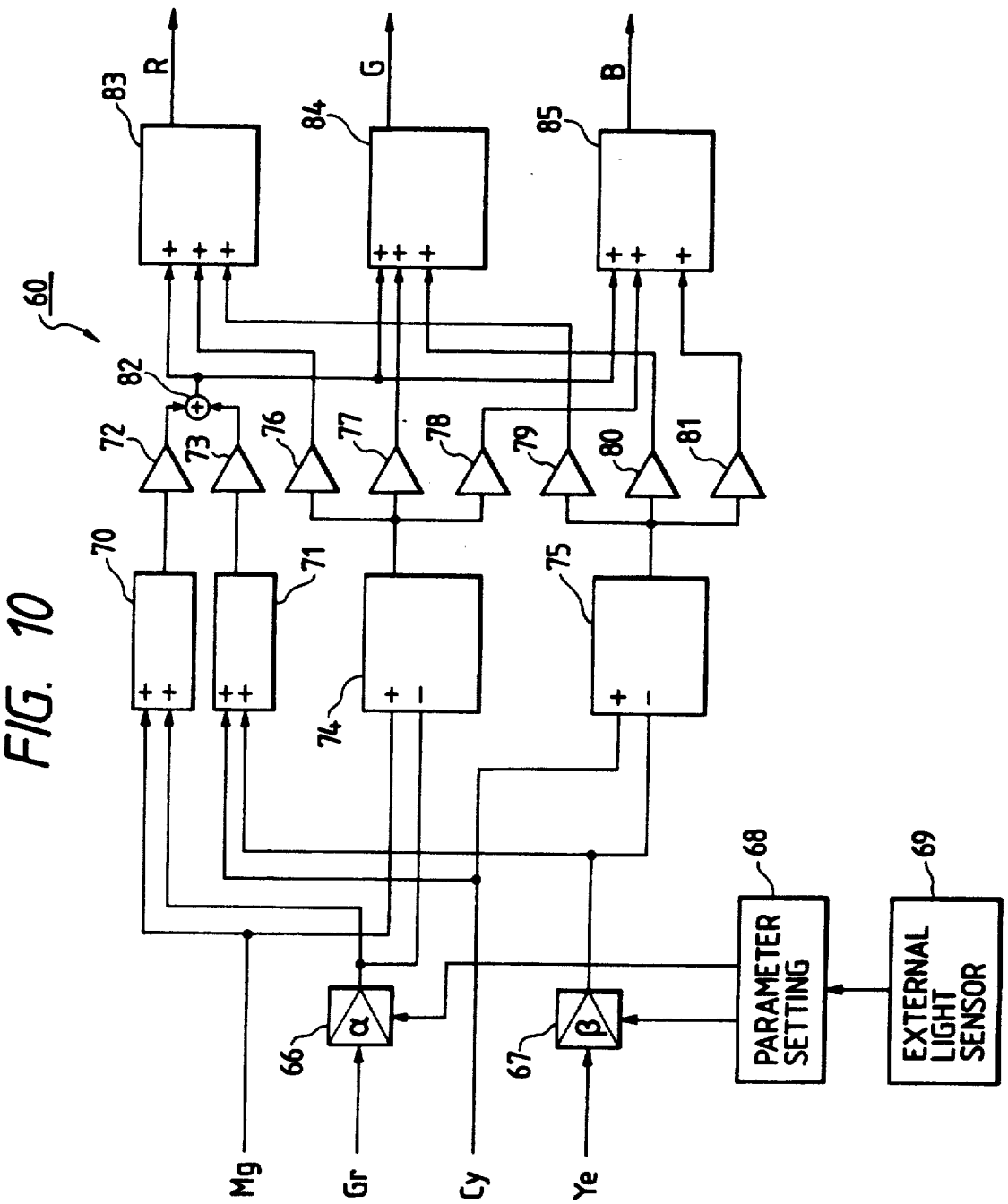
FIG. 10 is a block diagram showing a main part of the signal processing apparatus shown in FIG. 9.

Of the outputs from the interpolation filters 25 to 28, Gr and Ye are respectively multiplied with $\alpha$ and $\beta$ in multipliers 66 and 67 in FIG. 10. The constants $\alpha$ and $\beta$ are optimally set by a parameter setting unit 68 in accordance with color data from an external light sensor 69 for detecting a color temperature of external light, and are written in multiplicator RAMs in the multipliers 66 and 67. A ROM in the parameter setting unit 68 prestores $\alpha$ and $\beta$ values which can satisfy equation (13) for various measured color temperatures. The external light sensor 69 measures external light, and outputs, e.g., an R/B ratio in a DC mode. This voltage is A/D-converted by the parameter setting unit 68, and is used as a read address for the above-mentioned ROM.

Then, color signals Mg, $\alpha$Gr, Cy, and $\beta$Ye are converted to R, G, and B signals in accordance with equations (22), (23), and (24) described above.

More specifically, an adder 70 calculates a sum of Mg and $\alpha$Gr, an adder 71 calculates a sum of Cy and $\beta$Ye, and constant multipliers 72 and 73 respectively multiply p and Q with the outputs from the adders 70 and 71.

Subtracters 74 and 75 respectively calculate (Mg-$\alpha$Gr) and (Cy-$\beta$Ye). Constant multipliers 76 to 81 are set to have constants $R_1$, $G_1$, $B_1$, $R_2$, $G_2$, and $B_2$, respectively.

An adder 82 adds the outputs from the multipliers 72 and 73.

An adder 83 adds three outputs from the adder 82 and the multipliers 76 and 79 to calculate R in accordance with equation (22). The same applies to G and B.

In this manner, the matrix calculations given by equation (18) can be executed by 11 additions/subtractions and 8 multiplications, and the conditions given by equations (16) and (17) are satisfied. Therefore, reproduction of a false color can be minimized.

Note that G and B can be obtained by calculations in adders 84 and 85.

A method of determining the constants P, Q, $R_1$, $G_1$, $B_1$, $R_2$, $G_2$, and $B_2$ in equations (11), (12), and (13) will be described below. In the matrix given by equation (18), the number of parameters is normally 12. However, the number of parameters can be reduced to 8.

Spectral characteristics Mg($\lambda$), Gr($\lambda$), Cy($\lambda$), and Ye($\lambda$) of color filters Mg, Gr, Cy, and Ye are measured within the range of 380 nm to 780 nm at 10-nm intervals, thus obtaining Mg($\lambda$i), Gr($\lambda$i), Cy($\lambda$i), and Ye($\lambda$i) (i=1, ..., 41). Then, ideal NTSC RGB spectral characteristics r($\lambda$i), g($\lambda$i), and b($\lambda$i) are cited from "Handbook of Theory of Colors" (Tokyo University Press (1981)).

Then, equations (22), (23), and (24) are rewritten as:

$$\begin{bmatrix} R \\ G \\ B \end{bmatrix} = \begin{bmatrix} P+R_1 & P-R_1 & Q+R_2 & Q-R_2 \\ P+G_1 & P-G_1 & Q+G_2 & Q-G_2 \\ P+B_1 & P-B_1 & Q+B_2 & Q-B_2 \end{bmatrix} \begin{bmatrix} Mg \\ Gr \\ Cy \\ Ye \end{bmatrix} \quad (25)$$

Therefore, equivalent spectral characteristics R($\lambda$), G($\lambda$), and B($\lambda$) of the signals R, G, and B converted by equation (25) are given by:

$$\begin{bmatrix} R(\lambda) \\ G(\lambda) \\ B(\lambda) \end{bmatrix} = \begin{bmatrix} P+R_1 & P-R_1 & Q+R_2 & Q-R_2 \\ P+G_1 & P-G_1 & Q+G_2 & Q-G_2 \\ P+B_1 & P-B_1 & Q+B_2 & Q-B_2 \end{bmatrix} \begin{bmatrix} Mg(\lambda) \\ \alpha Gr(\lambda) \\ Cy(\lambda) \\ \beta Ye(\lambda) \end{bmatrix} \quad (26)$$

This matrix is approximated to the ideal NTSC RGB spectral characteristics r($\lambda$), g($\lambda$), and b($\lambda$) described above as much as possible.

Since the eight parameters $P_1$ and $Q_1$, and Ri, Gi, and $B_i$ (i=1 and 2) should be constant regardless of a color temperature, these parameters are preferably determined using α and β for, e.g., 5,100° K.

For this purpose, for example, a method of least squares is used.

More specifically, an error function E (P, Q, $R_i$, $G_i$, $B_i$) is defined as follows:

$$E(P Q R_i G_i B_i) = \sum_{k=1}^{N} \{[r(\lambda_i) - R(\lambda_i)]^2 + \quad (27)$$

$$[g(\lambda_i) - G(\lambda_i)]^2 + [b(\lambda_i) - B(\lambda_i)]^2$$

This function is partially differentiated by each of P, Q, $R_i$, $G_i$, and $B_i$ (i = 1 and 2), and is substituted with 0, thus obtaining simultaneous linear equations with 8 unknowns. Then, these equations can be solved for P, Q, $R_i$, $G_i$, and $B_i$, respectively.

In this manner, when optimization is performed for colors, R=Q cannot always be established. However, color reproducibility can be better than in a case of P=Q since the number of parameters is larger by one.

Thus, α and β can be adjusted, and a white balance can be obtained. When the outputs from the subtracters 74 and 75 become 0, R=G=B can always be established.

In a γ conversion unit 62, the R, G, and B signals are Y-converted by table conversion.

In a color difference matrix unit 63, matrix calculations are performed in accordance with equation (28). In this unit, since integer type fixed multiplications are performed, the coefficients are preferably approximated to additions/subtractions of some powers of 2.

$$\begin{bmatrix} Y \\ R-Y \\ B-Y \end{bmatrix} = \begin{bmatrix} 0.30 & 0.59 & 0.11 \\ 0.70 & -0.59 & -0.11 \\ -0.30 & -0.59 & 0.89 \end{bmatrix} \begin{bmatrix} R\lambda \\ G\lambda \\ B\lambda \end{bmatrix} \quad (28)$$

Seventh Embodiment

As still another embodiment of the present invention, a case of P=Q may be considered. When P=Q and Mg(λ)+Gr(λ)=Cy(λ)+Ye(λ) may be established, adders 70 and 71 and constant multipliers 72 and 73 can be commonized.

Of course, in place of the above-mentioned hardwired arrangement, matrix calculations may be performed by directly using a coefficient $\{a_{ij}\}$ satisfying the conditions of equations (16) and (17) in a software manner using DSP (digital signal processing) to convert color signals into R, G, and B signals.

Figure 11:
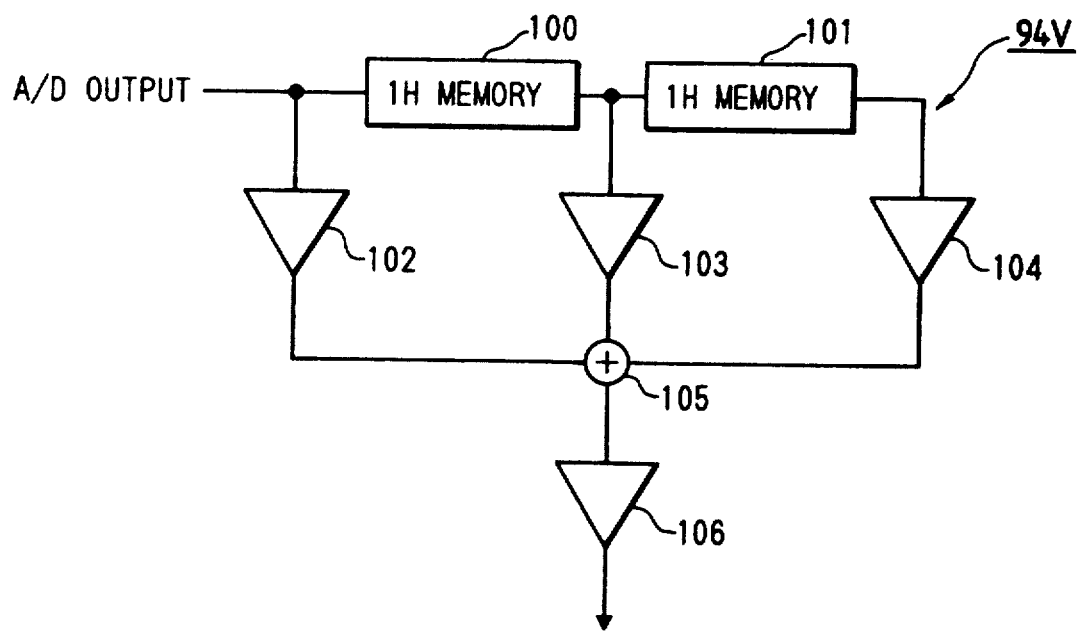
FIG. 11 is a view showing another filter matrix.

The present invention is effective when sensor outputs of a filter matrix shown in FIG. 11 are read out in units of two horizontal lines while being mixed in the vertical direction or when signals repeat two colors in the vertical direction and two colors in the horizontal direction (i.e., a total of four colors) like a CCD in which two filters are adhered to each other by dividing each pixel into halves, in addition to a case wherein a sensor having filters shown in FIG. 1A is interlace-scanned.

A luminance signal contributes to an improvement of color reproducibility by using a sum of $Y_L$ obtained by weighting R, G, and B, and a signal obtained by high-pass filtering the sensor signals. Alternatively, Mg, Gr, Cy, and Ye signals which are not subjected to low-pass filtering may be weighted in the same manner as in the present invention and may be directly used.

As a means for equalizing responses to an achromatic color, analog circuits for four channels may be arranged before an A/D converter, as a matter of course.

As described above, according to the present invention, color reproducibility is good, and reproduction of a vertical false color is minimized. In addition, a color signal processing apparatus can be realized by a very simple hardware arrangement.

Still another embodiment of the present invention will be described below. The present invention is to prevent reproduction of a vertical false color caused by a change in color temperature while maintaining good color reproducibility.

Eighth Embodiment

Figure 12:
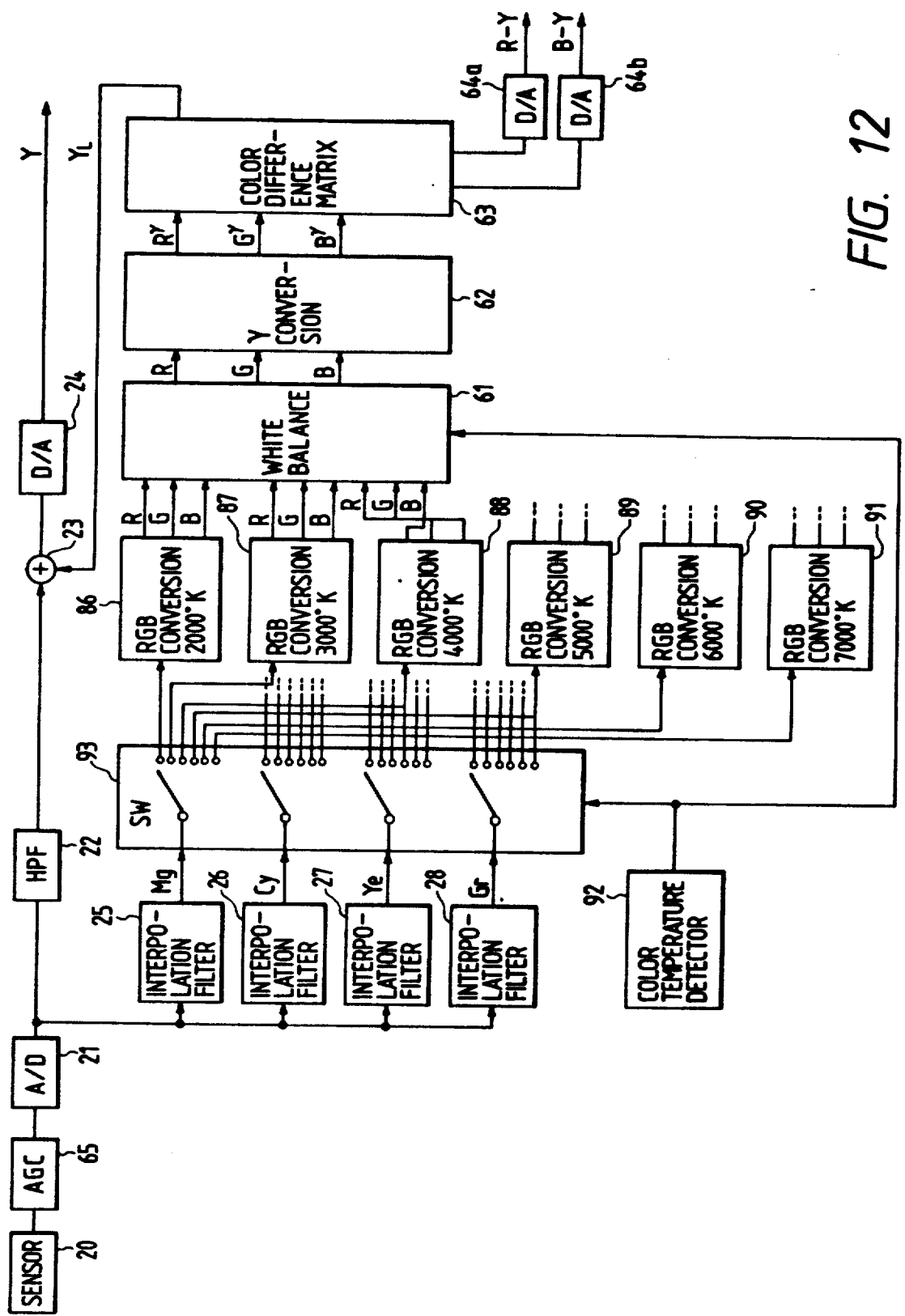
FIG. 12 is a block diagram showing another embodiment of a signal processing apparatus.

FIG. 12 shows an embodiment when a CCD having color filters shown in FIG. 1A is interlace-scanned.

In this case, four color signals Mg, Gr, Cy, and Ye must be caused to coincide with each other. This is because these four data are converted to color signals R, G, and B by calculations.

If a sensor has an arrangement capable of simultaneously reading four lines like a MOS sensor, this can be executed without posing a problem. However, in a sensor which is impossible to do it like a CCD, the color signals must be two-dimensionally interpolated to be caused to coincide with each other.

For example, when Mg is considered in the case of sensor outputs shown in FIG. 1A, its sampling position corresponds to a position indicated by a mark "o" in FIG. 1(b). Other positions indicated by a mark "x" have other color data but have no Mg color data. Therefore, these positions are interpolated by appropriately weighting data indicated by the mark "o" (e.g., A to H). This is a coinciding operation by a two-dimensional interpolation filter. This operation is performed for each color.

In consideration of the above principle, a description will be made below with reference to FIG. 12.

In a CCD sensor 20, four types of color filters are arranged, as shown in FIG. 1A. A video signal read from the sensor 20 by interlaced scanning in units of pixels is input to an AGC circuit 65 to be subjected to gain control and is then A/D-converted by an A/D converter 21 at a timing synchronous with a read clock. For color processing to be performed later, the A/D converter 21 preferably performs A/D conversion of 8 or more bits from the viewpoints of good linear characteristics and a quantization error.

A luminance signal is output as follows. That is, a high-frequency component is detected by a high-pass filter 22, and is added to a low-frequency component $Y_L$ obtained by a method to be described later in an adder 23. The sum signal is D/A-converted by a D/A converter 24, thus outputting the luminance signal.

The output from the A/D converter 21 is input to four interpolation filters 25, 26, 27, and 28. Each of these four interpolation filters has an arrangement as shown in FIG. 5 or 6 described above, and outputs of these filters become coincided color signals Mg, Cy, Ye, and Gr, as has been described above.

When coincided Mg, Cy, Ye, and Gr signals can be obtained in FIG. 12, all the following calculation processing need only be performed once per several read clocks for each pixel. This is because a band of a color signal is generally narrow. Therefore, after the interpolation filters, thinning processing is performed so that the following calculation processing is performed at a relatively low speed. Thus, power consumption can be greatly reduced.

RGB conversion units 86 to 91 will be described below.

Spectral characteristics $Mg(\lambda)$, $Gr(\lambda)$, $Cy(\lambda)$, and $Ye(\lambda)$ of color signals Mg, Gr, Cy, and Ye are measured within the range of 380 nm to 780 nm at 10-nm intervals, thus obtaining $Mg(\lambda i)$, $Gr(\lambda i)$, $Cy(\lambda i)$, and $Ye(\lambda i)$ ($i=1, \ldots, 41$).

Then, ideal NTSC RGB spectral characteristics $r(\lambda i)$, $g(\lambda i)$, and $b(\lambda i)$ are read from "Handbook of Theory of Colors" (Tokyo University Press (1981)), and normal equations equally weighted by equation (5) described above are solved.

In this case, in order to satisfy $R(\lambda)=G(\lambda)=B(\lambda)$ for the purpose of preventing a false color, the following two conditions are also satisfied at the same time:

$$R(\lambda) = (a_{11} + a_{12}/\alpha)V_1(\lambda) + (a_{13} + a_{14}/\beta)V_2(\lambda)$$

$$G(\lambda) = (a_{21} + a_{22}/\alpha)V_1(\lambda) + (a_{23} + a_{24}/\beta)V_2(\lambda)$$

$$B(\lambda) = (a_{31} + a_{32}/\alpha)V_1(\lambda) + (a_{33} + a_{34}/\beta)V_2(\lambda)$$

where $$a_{11} + a_{12}/\alpha = a_{21} + a_{22}/\alpha = a_{31} + a_{32}/\alpha$$

$$a_{13} + a_{14}/\alpha = a_{23} + a_{24}/\beta = a_{33} + a_{34}/\beta \quad (29)$$

Since $\alpha$ and $\beta$ change depending on a color temperature of an object, $\alpha$ and $\beta$ of an achromatic object at respective color temperatures of 2,000° K., 3,000° K., 4,000° K., 5,000° K., 6,000° K., and 7,000° K. are measured in advance.

Assuming that a product of a $Gr(\lambda)$ output multiplied with $\alpha$ and a product of a $Cy(\lambda)$ output multiplied with $\beta$ are respectively represented by $Gr'(\lambda)$ and $Ye'(\lambda)$, color signals are converted based on the following equation in place of equation (6):

$$\begin{bmatrix} R \\ G \\ B \end{bmatrix} = [a_{ij}] \begin{bmatrix} Mg \\ Gr' \\ Cy \\ Ye' \end{bmatrix} \quad (30)$$

At this time, equations (29) are respectively rewritten as:

$$a_{11} + a_{12} = a_{21} + a_{31} + a_{32}$$

$$a_{13} + a_{14} = a_{23} + a_{24} = a_{33} + a_{34} \quad (31)$$

Therefore, equation (4) described above can be written as:

$$E(A) = \quad (32)$$

$$\sum_{i=1}^{N} [\{r(\lambda i) - (a_{11}Mg(\lambda i) + a_{12}Gr'(\lambda i) + a_{13}Cy(\lambda i) + a_{14}Ye'(\lambda i))\}^2 + \{g(\lambda i) - (a_{21}Mg(\lambda i) + a_{22}Gr'(\lambda i) + a_{23}Cy(\lambda i) + a_{24}Ye'(\lambda i))\}^2 + \{b(\lambda i) - (a_{31}Mg(\lambda i) + a_{32}Gr'(\lambda i) + a_{33}Cy(\lambda i) + a_{34}Ye'(\lambda i))\}^2]$$

where $Gr'(\lambda) = Gr(\lambda) \times \alpha$, and $Ye'(\lambda) = Ye(\lambda) \times \beta$. Assuming that $$E'(A) = E(A) + l_1(a_{11} + a_{12} - a_{21} - a_{22}) + \quad (33)$$

$$l_2(a_{11} + a_{12} - a_{31} - a_{32}) + l_3(a_{13} + a_{14} - a_{23} - a_{24})$$

$$l_4(a_{13} + a_{14} - a_{33} - a_{34})$$

if $E(A)$ takes a minumum value, $E'(A) = E(A)$ from equation (17), and a maximum value is yielded. Therefore, $$\frac{\partial E(A)}{\partial a_{ij}} = 0 \quad (34)$$

When equation (34) is solved as the normal equation in the same manner as equation (5) described above, $[a_{ij}]$ is given as a function of $l_1$ to $l_4$.

Since a coefficient to be obtained satisfies equations (31), an evaluation function $F(l)$ when $l_1$, $l_2$, $l_3$, and $l_4$ are are set is defined as follows:

$$F(l) = |a_{11}(l) + a_{12}(l) - a_{21}(l) - a_{22}(l)| + \quad (35)$$

$$|a_{11}(l) + a_{12}(l) - a_{31}(l) - a_{32}(l)| +$$

$$|a_{13}(l) + a_{14}(l) - a_{23}(l) - a_{24}(l)| +$$

$$|a_{13}(l) + a_{14}(l) - a_{33}(l) - a_{34}(l)|$$

for $l = (l_1, l_2, l_3, l_4)$ $l_1$, $l_2$, $l_3$, and $l_4$ are respectively set to be given initial values $l_{10}$, $l_{20}$, $l_{30}$, and $l_{40}$, and parameters of the setting values are slightly offset by $\Delta l_1$, $\Delta l_2$, $\Delta l_3$, and $\Delta l_4$ to obtain $[a_{ij}]$ for various $l_1$, $l_2$, $l_3$, and $l_4$ according to equation (34). Then, $F(l)$ is obtained using the obtained $[a_{ij}]$ according to equation (35).

When a set of $l = (l_1, l_2, l_3, l_4)$ for minimizing $F(l)$ is obtained, the corresponding $[a_{ij}]$ is a coefficient to be obtained. Therefore, $[a_{ij}]$ has different optimal values depending on color temperatures since equation (30) varies in accordance with $\alpha$ and $P$. Therefore, a plurality of RGB conversion units 86 to 91 are arranged to perform different matrix calculations in correspondence with color temperatures.

A switching operation of RGB conversion matrices based on color temperatures may be performed by a manual switch in accordance with external light. However, in this embodiment, a color temperature detector 92 makes a judgment of a ratio of a red light component and a blue light component obtained from external light spectral characteristics, thereby automatically switching a switch 93.

Color reproduction may be attained by using fixed multipliers determined by approximating matrix coefficients. In this embodiment, RGB conversion tables suitable for 2,000° K., 3,000° K., 4,000° K., 5,000° K., 6,000° K., and 7,000° K. are used. When conversion matrices are obtained in finer steps of color temperatures, still perfect signal processing can be realized.

The R, G, and B signals thus converted and formed are input to a white balance circuit 61 so that a ratio thereamong is controlled again, and then, are input to a $\gamma$ conversion circuit 62 to be $\gamma$-converted. Thereafter, the resultant signals are input to a color difference matrix circuit 63 to form a low-frequency luminance signal $Y_L$ and color difference signals R-Y and B-Y. The low-frequency luminance signal $Y_L$ is input to an adder 23, thus forming a luminance signal, as described above.

The color difference signals R-Y and B-Y are converted into analog signals by D/A converters 64a and 64b, respectively.

Ninth Embodiment

RGB conversion and white balance processing shown in FIG. 12 may be commonized. More specifically, in FIG. 12, the white balance circuit 61 converts the R, G, and B signals into xR, G, and yB signals to obtain a white balance. Alternatively, multipliers in the RGB conversion units 86 to 91 may comprise variable multipliers, so that coefficients are variably controlled in accordance with an output from the color temperature detector 92. More specifically, in place of the matrix A obtained in the eighth embodiment, the following matrix is employed:

$$A' = \begin{bmatrix} xa_{11} & xa_{12} & xa_{13} & xa_{14} \\ a_{21} & a_{22} & a_{23} & a_{24} \\ ya_{31} & ya_{32} & ya_{33} & ya_{34} \end{bmatrix}$$

Note that coefficients x and y are determined according to color temperatures which are classified into 32 steps between 2,000° K. to 7,000° K. In order to perform color reproduction with higher precision, the number of steps of color temperatures can be increased.

As described above, according to the present invention, R, G, and B signals are formed in accordance with a color temperature upon input using all the color signals corresponding to color filters formed on a solid-state image pickup element. Therefore, correct white balance processing and γ conversion can be performed, thus greatly improving color reproducibility. In addition, since calculations for RGB conversion are changed in accordance with a color temperature upon input over a wide range, a vertical false color signal can be prevented.

Still another embodiment of the present invention will be described below. The present invention is to prevent generation of a vertical false color caused by a change in color temperature while maintaining good color reproducibility.

Tenth Embodiment

Figure 13:
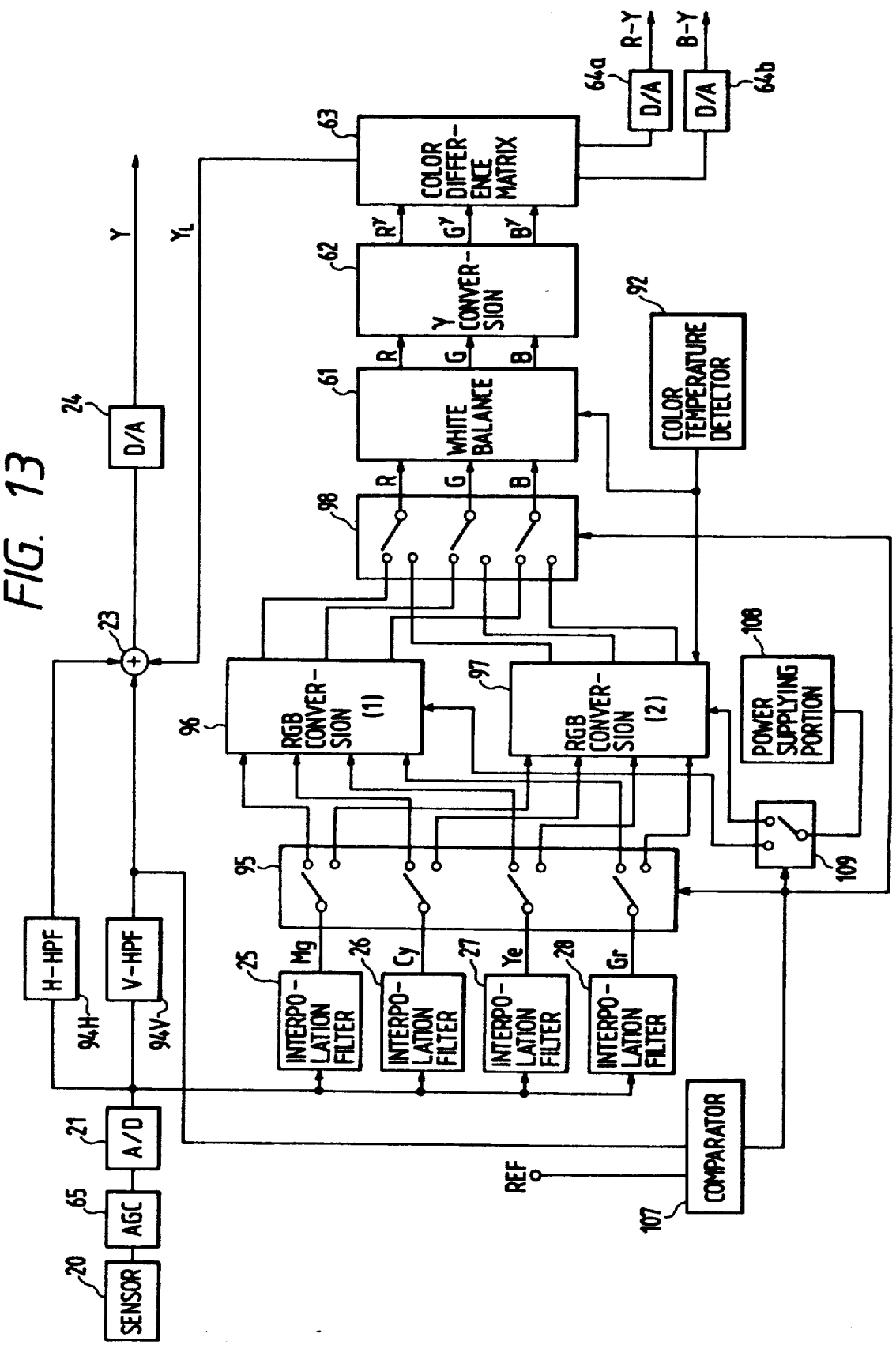
FIG. 13 is a block diagram showing still another embodiment of a signal processing apparatus.

FIG. 13 shows an embodiment when a CCD having color filters shown in FIG. 1A is interlace-scanned.

In this case, four color signals Mg, Gr, Cy, and Ye must be caused to coincide with each other. This is because these four data are converted to color signals R, G, and B by calculations.

If a sensor has an arrangement capable of simultaneously reading four lines like a MOS sensor, this can be executed without posing a problem. However, in a sensor which is impossible to do it like a CCD, the color signals must be two-dimensionally interpolated to be caused to coincide with each other.

For example, when Mg is consdered in the case of sensor outputs shown in FIG. 1A, its sampling position corresponds to a position indicated by a mark "o" in FIG. 1B. Other positions indicated by a mark "x" have other color data but have no Mg color data. Therefore, these positions are interpolated by appropriately weighting data indicated by the mark "o" (e.g., A to H). This is a coinciding operation by a two-dimensional interpolation filter. This operation is performed for each color.

In consideration of the above principle, a description will be made below with reference to FIG. 13.

In a CCD sensor 20, four types of color filters, i.e., Mg, Gr, Cy, and Ye filters are arranged, as shown in FIG. 1A. A video signal read from the sensor 20 by interlaced scanning in units of pixels is input to an AGC circuit 65 to be subjected to gain control and is then A/D-converted by an A/D converter 21 at a timing synchronous with a read clock. For color processing to be performed later, the A/D converter 21 preferably performs A/D conversion of 8 or more bits from the viewpoints of good linear characteristics and a quantization error.

A luminance signal is output as follows. That is, a high-frequency component is detected by vertical and horizontal high pass filters 94V and 94H, and is added to a low-frequency component $Y_L$ obtained by a method to be described later in an adder 23. The sum signal is D/A-converted by a D/A converter 24, thus outputting the luminance signal.

The output from the A/D converter 21 is input to four interpolation filters 25, 26, 27, and 28. Each of these four interpolation filters has an arrangement as shown in FIG. 5 or 6 described above, and outputs of these filters become coincided color signals Mg, Cy, Ye, and Gr, as has been described above.

When coincided Mg, Cy, Ye, and Gr signals can be obtained in FIG. 13, all the following calculation processing need only be performed once per several read clocks for each pixel. This is because a band of a color signal is generally narrow. Therefore, after the interpolation filters, thinning processing is performed so that the following calculation processing is performed at a relatively low speed. Thus, power consumption can be greatly reduced.

Note that the vertical high-pass filter in this embodiment can have an arrangement as shown in, e.g., FIG. 14.

The interpolated signals are input to RGB conversion units 96 and 97 as the characteristic feature of the present invention.

The RGB conversion units 96 and 97 will be described below. As described above, spectral characteristics Mg(λ), Gr(λ), Cy(λ), and Ye(λ) of color signals Mg, Gr, Cy, and Ye are measured within the range of 380 nm to 780 nm at 10-nm intervals, thus obtaining Mg(λi), Gr(λi), Cy(λi), and Ye(λi) (i=1, ..., 41).

Then, ideal NTSC RGB spectral characteristics r(i), g(i), and b(i) are read from "Handbook of Theory of Colors" (Tokyo University Press (1981)), and normal equations equally weighted by equation (5) described above are solved.

Furthermore, the coefficient $[a_{ij}]$ in the linear matrix A in equation (3) described above must satisfy the following conditions. For example, when sensor outputs of an achromatic object are output through filters shown in FIG. 1A, if output signals Mg(λ), Gr(λ), Cy(λ), and Ye(λ) are converted by a matrix $[a_{ij}]$ (i=3, j=4), the converted R, G, and B signals are respectively given by:

$$R(\lambda) = a_{11} Mg(\lambda) + a_{12} Gr(\lambda) + a_{13} Cy(\lambda) + a_{14} Ye(\lambda)$$

$$G(\lambda) = a_{21} Mg(\lambda) + a_{22} Gr(\lambda) + a_{23} Cy(\lambda) + a_{24} Ye(\lambda)$$

$$B(\lambda) = a_{31} Mg(\lambda) + a_{32} Gr(\lambda) + a_{33} Cy(\lambda) + a_{34} Ye(\lambda)$$

In this case, if the Mg and Gr positions of filters are assumed to coincide with a dark portion of an object and the Cy and Ye positions are assumed to coincide with a bright portion of the object, the following relations can be established with any interpolation filters:

$$Mg(\lambda) = \alpha Gr(\lambda) = V_1(\lambda)$$

$$Cy(\lambda) = \beta Ye(\lambda) = V_2(\lambda) \quad (37)$$

$\alpha$ and $\beta$ are parameters depending on a color temperatures of an object.

From equations (36) and (37), $$R(\lambda) = (a_{11} + a_{12}/\alpha) V_1(\lambda) + (a_{13} + a_{14}/\beta) V_2(\lambda)$$

$$G(\lambda) = (a_{21} + a_{22}/\alpha) V_1(\lambda) + (a_{23} + a_{24}/\beta) V_2(\lambda)$$

$$B(\lambda) = (a_{31} + a_{32}/\alpha) V_1(\lambda) + (a_{33} + a_{34}/\beta) V_2(\lambda)$$

Since this object has an achromatic color, a false color is reproduced in a vertical direction unless $R(\lambda) = G(\lambda) = B(\lambda)$ for all $V_1(\lambda)$ and $V_2(\lambda)$. In addition, $\alpha$ and $\beta$ change depending on a color temperature of an object, and $R(\lambda)$, $G(\lambda)$, and $B(\lambda)$ are also changed.

For this reason, in order to satisfy $R(\lambda) = G(\lambda) = B(\lambda)$ for the purpose of preventing a false color, the following two conditions are also satisfied at the same time:

$$a_{11} + a_{12}/\alpha = a_{21} + a_{22}/\alpha = a_{31} + a_{32}/\alpha$$

$$a_{13} + a_{14}/\beta = a_{23} + a_{24}/\beta = a_{33} + a_{34}/\beta \quad (39)$$

Since $\alpha$ and $\beta$ change depending on a color temperature of an object, $\alpha$ and $\beta$ of an achromatic object at respective color temperatures are measured in advance.

Assuming that a product of a $Gr(\lambda)$ output multiplied with $\alpha$ and a product of a $Cy(\lambda)$ output multiplied with $\beta$ are respectively represented by $Gr'(\lambda)$ and $Ye'(\lambda)$, color signals are converted based on the following equation in place of equation (6):

$$\begin{bmatrix} R \\ G \\ B \end{bmatrix} = [a_{ij}] \begin{bmatrix} Mg \\ Gr' \\ Cy \\ Ye' \end{bmatrix} \quad (40)$$

At this time, equations (39) are respectivley rewritten as:

$$a_{11} + a_{12} = a_{21} + a_{22} = a_{31} + a_{32}$$

$$a_{13} + a_{14} = a_{23} + a_{24} = a_{33} + a_{34} \quad (41)$$

Therefore, equation (4) described above can be written as:

$$E(A) = \sum_{i=1}^{N} [\{r(\lambda_i) - \{a_{11} Mg(\lambda_i) + a_{12} Gr'(\lambda_i) + a_{13} Cy(\lambda_i) + a_{14} Ye'(\lambda_i)\}\}^2 + \{g(\lambda_i) - \{a_{21} Mg(\lambda_i) + a_{22} Gr'(\lambda_i) + a_{23} Cy(\lambda_i) + a_{24} Ye'(\lambda_i)\}\}^2 + \{b(\lambda_i) - \{a_{31} Mg(\lambda_i) + a_{32} Gr'(\lambda_i) + a_{33} Cy(\lambda_i) + a_{34} Ye'(\lambda_i)\}\}^2] \quad (42)$$

where $Gr'(\lambda) = Gr(\lambda) \times \alpha$, and $Ye'(\lambda) = Ye(\lambda) \times \beta$.

It is assumed that $$E'(A) = E(A) + l_1(a_{11} + a_{12} - a_{21} - a_{22}) + \quad (43)$$

-continued $$l_2(a_{11} + a_{12} - a_{31} - a_{32}) + l_3(a_{13} + a_{14} - a_{23} - a_{24}) + l_4(a_{13} + a_{14} - a_{33} - a_{34})$$

if $E(A)$ takes a minumum value, $E'(A) = E(A)$ from equation (17), and a maximum value is yielded. Therefore, $$\frac{\partial E'(A)}{\partial a_{ij}} = 0 \quad (44)$$

When equation (44) is solved as the normal equation in the same manner as equation (5) described above, $[a_{ij}]$ is given as a function of $l_1$ to $l_4$.

Since a coefficient to be obtained satisfies equations (41), an evaluation function $F(l)$ when $l_1$, $l_2$, $l_3$, and $l_4$ are set is defined as follows:

$$F(l) = |a_{11}(l) + a_{12}(l) - a_{21}(l) - a_{22}(l)| + \quad (45)$$
$$|a_{11}(l) + a_{12}(l) - a_{31}(l) - a_{32}(l)| +$$
$$|a_{13}(l) + a_{14}(l) - a_{23}(l) - a_{24}(l)| +$$
$$|a_{13}(l) + a_{14}(l) - a_{33}(l) - a_{34}(l)|$$

for $l = (l_1, l_2, l_3, l_4)$ $l_1$, $l_2$, $l_3$, and $l_4$ are respectively set to be given as initial values $l_{10}$, $l_{20}$, $l_{30}$, and $l_{40}$, and parameters of the setting values are slightly offset by $\Delta l_1$, $\Delta l_2$, $\Delta l_3$, and $\Delta l_4$ to obtain $[a_{ij}]$ for various $l_1$, $l_2$, $l_3$, and $l_4$ according to equation (44). Then, $F(l)$ is obtained using the obtained $[a_{ij}]$ according to equation (45).

When a set of $l = (l_1, l_2, l_3, l_4)$ for minimizing $F(l)$ is obtained, the corresponding $[a_{ij}]$ is an optimal coefficient to be obtained. An RGB conversion unit 97 as a second matrix calculation means has a coefficient of $[a_{ij}]$ calculated in this manner.

Note that $[a_{ij}]$ has different optimal values depending on color temperatures since equation (40) varies in accordance with $\alpha$ and P.

The RGB conversion unit 97 of this embodiment switches RGB conversion matrix coefficients depending on a color temperature. For this purpose, a color temperature detector 92 makes a judgment of a ratio of a red light component and a blue light component obtained from external light spectral characteristics, thereby automatically switching matrix coefficients. More specifically, a plurality of RGB conversion tables are arranged and are switched in accordance with a color temperature.

The RGB conversion unit 96 will be described below. The RGB conversion unit constitutes a first matrix calculation means, and its coefficient $[a_{ij}]$ is set as follows.

Common portions in equations (41) are respectively given by 2P and 2Q:

$$a_{11} + a_{12} = a_{21} + a_{22} = a_{31} + a_{32} = 2P \quad (46)$$

$$a_{13} + a_{14} = a_{23} + a_{24} = a_{33} + a_{34} = 2Q \quad (47)$$

If $$a_{11} - a_{12} = 2R_1 \, a_{13} - a_{14} = 2R_2$$

$$a_{21} - a_{22} = 2G_1 \, a_{23} - a_{24} = 2G_2$$

$$a_{31} - a_{32} = 2B_1 \, a_{33} - a_{34} = 2B_2 \quad (48)$$

from equation (40), sicne R is given by:

$$R = a_{11}Mg + a_{12}Gr' + a_{13}Cy + a_{14}Ye'$$

according to equations (46), (47), and (48), $$R = (P + R_1)Mg + (P + R_1)Gr' + (Q + R_2)Cy + (Q + R_2)Ye' \quad (49)$$
$$= P(Mg + Gr') + Q(Cy + Ye') + R_1(Mg - Gr') + R_2(Cy - Ye')$$

Similarly, $$G = P(Mg+Gr') + Q(Cy+Ye') + G_1(Mg-Gr') + G_2(Cy-Ye') \quad (50)$$

$$B = P(Mg+Gr') + Q(Cy+Ye') + B_1(Mg-Gr') + B_2(Cy-Ye') \quad (51)$$

The coefficient of the RGB conversion unit 96 is determined to perform matrix calculations given by equations (49), (50), and (51).

A method of determining the constants $P$, $Q$, $R_1$, $G_1$, $B_1$, $R_2$, $G_2$, and $B_2$ in equatations (49), (50), and (51) will be described below. In the matrix given by equation (40), the number of parameters is normally 12. However, the number of parameters can be reduced to 8 by the condition given by equation (39).

First, the above-mentioned Mg($\lambda i$), Gr($\lambda i$), Cy($\lambda i$), Ye($\lambda i$), r($\lambda i$), g($\lambda i$), and b($\lambda i$) are obtained.

Then, equations (49), (50), and (51) are rewritten as:

$$\begin{bmatrix} R \\ G \\ B \end{bmatrix} = \begin{bmatrix} P+R_1 & P-R_1 & Q+R_2 & Q-R_1 \\ P+G_1 & P-G_1 & Q+G_2 & Q-G_2 \\ P+B_1 & P-B_1 & Q+B_2 & Q-B_2 \end{bmatrix} \begin{bmatrix} Mg \\ Gr' \\ Cy \\ Ye' \end{bmatrix} \quad (52)$$

Therefore, equivalent spectral characteristcs R($\lambda$), G($\lambda$), and B($\lambda$) of the signals R, G, and B converted by equation (52) are given by:

$$\begin{bmatrix} R(\lambda) \\ G(\lambda) \\ B(\lambda) \end{bmatrix} = \begin{bmatrix} P+R_1 & P-R_1 & Q+R_2 & Q-R_1 \\ P+G_1 & P-G_1 & Q+G_2 & Q-G_2 \\ P+B_1 & P-B_1 & Q+B_2 & Q-B_2 \end{bmatrix} \begin{bmatrix} Mg(\lambda) \\ \alpha Gr(\lambda) \\ Cy(\lambda) \\ \beta Ye(\lambda) \end{bmatrix} \quad (53)$$

This matrix is approximated to the ideal NTSC RGB spectral characteristics r($\lambda$), g($\lambda$), and b($\lambda$) described above as much as possible. Since the eight parameters $P_1$ and $Q_1$, and $R_i$, $G_i$, and $B_i$ ($i=1$ and 2) should be constant regardless of a color temperature, these parameters are preferably determined using $\alpha$ and $\beta$ for, e.g., 5,100° K. For this purpose, for example, a method of least squares is used.

More specifically, an error function E (P, Q, $R_i$, $G_i$, $B_i$) is defined as follows:

$$E(P,Q,R_i,G_i,B_i) = \sum_{k=1}^{N} \{[r(\lambda_i) - R(\lambda_i)]^2 + [g(\lambda_i) - G(\lambda_i)]^2 + [b(\lambda_i) - B(\lambda_i)]^2\} \quad (54)$$

This function is partially differentiated by each of P, Q, $R_i$, $G_i$, and $B_i$ ($i=1$ and 2), respectively, and is substituted with 0, thus obtaining simultaneous linear equations with 8 unknowns. Then, these equations can be solved for P, Q, $R_i$, $G_i$, and $B_i$, respectively.

In this manner, when optimization is performed for colors, P=Q cannot always be established. However, color reproducibility can be better than that in a case of P=Q since the number of parameters is larger by one.

Thus, $\alpha$ and $\beta$ can be adjusted, and a white balance can be obtained.

In general, when 3×4 matrix calculations are performed as in equation (40), 12 (=3×4) multiplications and 9 (=3×3) additions/subtractions are necessary.

However, in the RGB conversion unit 96, by utilizing the conditions given by equations (39), matrix calculations of R, G, and B signals can be performed as in equations (49), (50), and (51).

As a result, the number of multiplications can be reduced. For example, for R, the following calculations are necessary.

(1) calculations of P(Mg-Gr')+Q(Cy+Ye'): 3 additions/subtractions and two multiplications (2) calculations of $R_1$(Mg-Gr'): 1 addition/subtraction and 1 multiplication (3) calculations of $R_2$(Cy-Ye'): 1 addition/subtraction and 1 multiplication (4) calculations of (1)+(2)+(3): 2 additions/subtractions Of these calculations, since additons/subtractions in (1) and (2), and (3) can be commonized among colors, the above calculations for all the colors can be executed by:

3+1+1+3×2=11 (additions/subtractions)

2+3×1+3×1=8 (multiplications)

The R, G, and B signals thus converted and formed are input to a white balance circuit 61 through a switch 98 so that a ratio thereamong is controlled again, and then, are input to a $\gamma$ conversion circuit 62 to be $\gamma$-converted. Thereafter, the resultant signals are input to a color difference matrix circuit 63 to form a low-frequency luminance signal $Y_L$ and color difference signals R-Y and B-Y. The low-frequency luminance signal $Y_L$ is input to an adder 23, thus forming a luminance signal, as described above. The luminance signal is converted into an analog luminance signal by a D/A converter 24.

The color difference signals R-Y and B-Y are converted into analog color difference signals by D/A converters 64 and 64, respectively.

Note that a high-frequency component is extracted from the output signal from the A/D converter 21 by a vertical high-pass filter 94V. The detailed arrangement of the filter 94V is shown in FIG. 14.

The filter 94V comprises 1H delay memories 100 and 101, and coefficient multipliers 102 to 104. The multipliers 102 to 104 respectively have coefficients of $-\frac{1}{2}$, 1, and $-\frac{1}{2}$. The outputs from these multipliers are added by an adder 105, and the sum is supplied to another coefficient multiplier 106. The output of the high-pass filter 94V with the above arrangement is input to a comparator 107, and is compared with a predetermined threshold value REF. When the output of the filter is larger than the threshold value, i.e., there are many high-frequency components, the switch 95 is switched in response to the output from the comparator 107 so that the outputs (Mg, Cy, Ye, and Gr) of the interpolation filters 25 to 28 are input to the RGB conversion unit 96 as the first matrix calculation means. When the input to the comparator 107 is smaller than the threshold value, the switch 95 is switched so that the outputs of the interpolation filters are input to the RGB conversion unit 97 as the second matrix conversion means.

These operations are performed for the following reason. That is, upon conversion in the first matrix calculation means, a vertical false color can be effectively eliminated. However, since the degree of freedom of 12 coefficients in the second matrix calculation means is 9 in the first matrix calculation means, color reproduction is restricted, and optimal color reproduction is disturbed. On the other hand, the second matrix calculation means can very faithfully realize color reproduction but has a drawback that a vertical false color signal tends to be reproduced.

In this embodiment, the merits and demerits of these matrix calculation means are combined. That is, when the output signals from an image pickup element include many vertical high-frequency components and a false color tends to be reproduced, the first matrix calculation means is used. When the output signals include a small number of vertical high-frequency components and a false color tends not to be reproduced, the second matrix calculation means with better color reproducibility is used. As a result, a color signal processing apparatus which has good color reproducibility and is free from reproduction of a false color can be obtained.

Note that the output from the comparator 107 is also input to a switch 109 for controlling feed lines from a power supplying portion 108 to the RGB conversion units 96 and 97, and the switch 109 is switched in cooperation with the switch 95, thus reducing power consumption during matrix calculations.

Eleventh Embodiment

Figure 15:
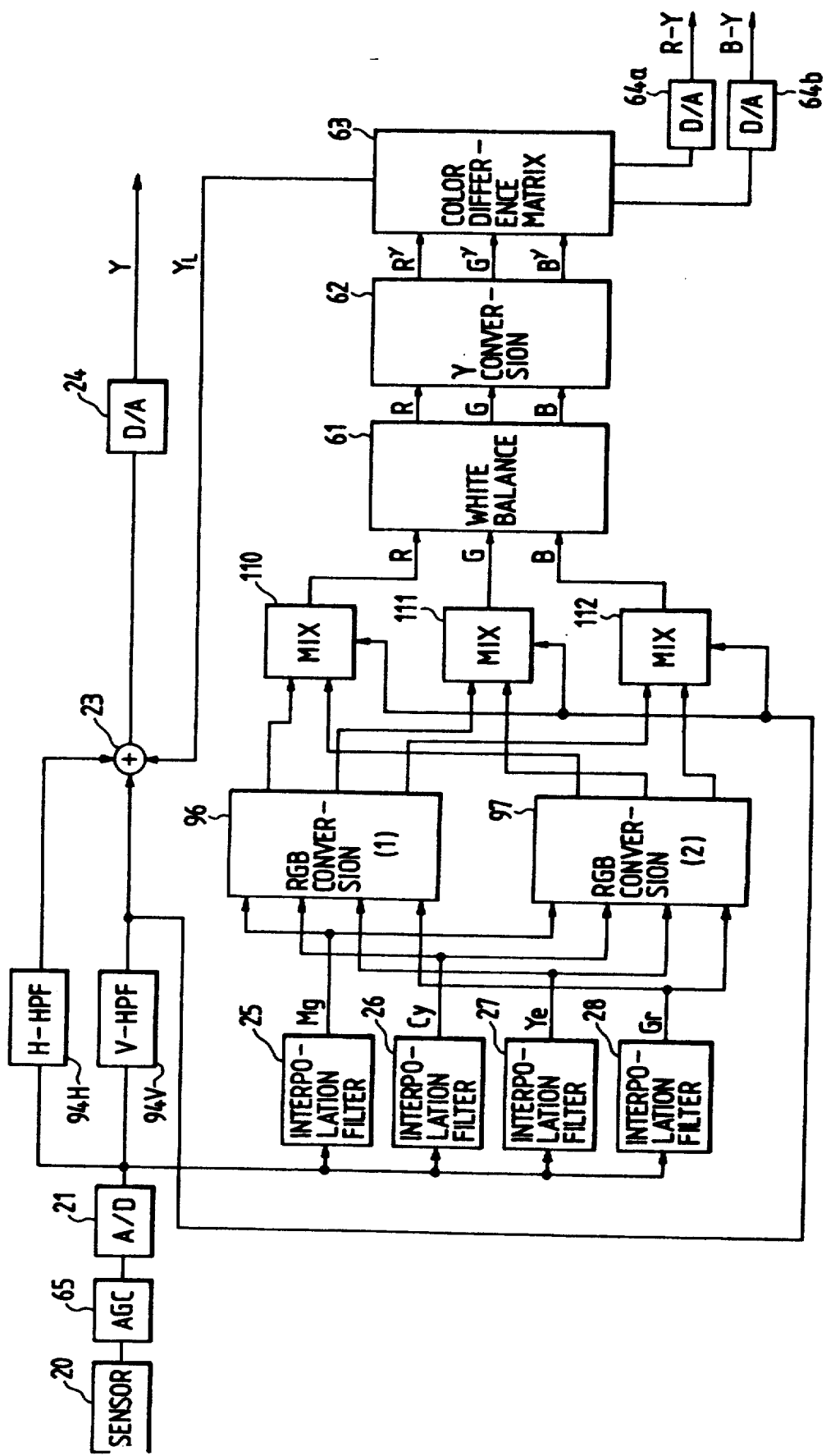
FIG. 15 is a block diagram showing still another embodiment of a signal processing apparatus.

FIG. 15 shows an eleventh embodiment of the present invention. In this embodiment, output signals Mg, Cy, Ye, and Gr from interpolation filters 25 to 28 are input to both RGB conversion units 96 and 97, and R, G, and B signals output from the RGB conversion units 96 and 97 are input to mixing circuits 110, 111, and 112. When many high-frequency components are included in the output from a high-pass filter 94V, each mixing circuit increases a mixing ratio of outputs from the RGB conversion unit 96 as compared to those from the RGB conversion unit 97; otherwise, decreases the mixing ratio, so that the mixing ratio is changed continuously or stepwise. This method has an effect that when outputs from the RGB conversion units 96 and 97 are largely different from each other, an image corresponding to a boundary between both the outputs can be prevented from being unnaturally changed.

The present invention is effective when a matrix shown in FIG. 7A is read out while being mixed in the vertical direction, or when signals repeat two colors in the horizontal direction and two colors in the vertical direction (i.e., a total of four colors) like a CCD in which one pixel is divided into halves, and filters are attached thereto, as shown in FIG. 7B in addition to a case wherein a CCD shown in FIG. 1A is interlace-scanned.

A luminance signal contributes to an improvement of color reproducibility by using a sum of $Y_L$ obtained by weighting R, G, and B, and a signal obtained by high pass filtering the sensor signals. Alternatively, Mg, Gr, Cy, and Ye signals which are not subjected to low-pass filtering may be weighted in the same manner as in the present invention and may be directly used. The present invention may be applied to either processing of motion pictures like in a movie video camera or processing of still images like in an electronic still camera.

As described above, according to the present invention, since R, G, and B signals are generated using all the color signals corresponding to color filters formed on a solid-state image pickup element, correct white balance processing and γ conversion can be performed.

In addition, a color signal processing apparatus which is free from reproduction of a vertical false color can be provided.

What is claimed is:

1. An image pickup apparatus wherein a solid-state image pickup element having at least three types of complementary color filters outputs color signals correspondign to said at least three types of complementary color filters and a first luminance signal is generated by using outputs of said solid-state image pickup element, and wherein linear matrix conversion of the color signals is determined according to spectral characteristics of said complementary color filters, and R, G, and B signals are generated by said linear matrix conversion using all of said color signals output from said solid-state image pickup element, a R-Y signal, a B-Y signal and a second luminance signal are generated by using said R, G and B signals, and a third luminance signal is generated by using said first and secodn luminance signals.

2. An apparatus accordng to claim 1, wherein a coefficient of the linear matrix conversion corresponds to a coefficient obtained by a method of least squares so as to represent reference spectral characteristics $r(\lambda)$, $g(\lambda)$, and $b(\lambda)$ of the R, G, and B signals by linearly coupled spectral characteristics $f_1(\lambda), \ldots, f_N(\lambda)$ of color filters of N colors.

3. An apapratus according to claim 1, wherein said solid-state image pickup element comprises a charge coupled device, and the color signals are cuased to coincide with each other by two-dimensional digital interpolation filters which commonize delays and taps among colors.

4. An apparatus according to claim 1, wherein said color filters include Mg, Gr, Cy and Ye filters.

5. An apparatus according to claim 1, wherein coefficients of a matrix for the linear matrix conversion are approximated by a power of 2 and digital calculations are performed using the matrix to perform the linear matrix conversion.

6. An apparatus according to claim 1, wherein the linear matrix conversion is performed by using a table having a predetermined coefficient.

7. An apparatus according to claim 1, wherein a coefficient of the linear matrix conversion corresponds to a coefficient which is obtained by a method of least squares so as to represent reference spectral characteristics $r(\lambda)$, $g(\lambda)$, and $b(\lambda)$ of the R, G, and B signals by linearly coupled spectral characteristics $f_1(\lambda), f_2(\lambda), \ldots, f_n(\lambda)$ of color filters of N colors, and which is weighted for white balance processing.

8. An image pickup apparatus comprising:
   a) image pickup means for photoelectrically converting a light incident from an object through at least three types of complementary color filters to extract color signals corresponding to said complementary color filters;
   b) coincidence means for causing all of the color signals extracted from said image pickup means to coincide with each other;

c) conversion means for performing linear matrix conversion of color signals in accordance with spectral characteristics of said complementary color filters by using all of the color signals extracted from said image pickup means and coincided by said coincidence means;

d) means for generating a first luminance signal by using outputs of said image pickup means;

e) means for generating R-Y, B-Y, and second luminance signals by using output signals of said conversion means; and f) means for generating a third luminance signal by using said first and second luminance signals.

9. An apparatus according to claim 8, wherein said coincidence means comprises two-dimensional digital interpolation filters which commonize delays and taps among colors.

* * * * *

UNITED STATES PATENT AND TRADEMARK OFFICE
CERTIFICATE OF CORRECTION

PATENT NO. : 5,202,756
DATED : April 13, 1993
INVENTOR(S) : SASAKI ET AL.

It is certified that error appears in the above-indentified patent and that said Letters Patent is hereby corrected as shown below:

Title Page:

At [56] References Cited

"4,975,769 12/1990 Aieu et al." should read --4,975,769 12/1990 Aizu et al.--

In the Drawings:

Sheet 3

Figure 4, "BALANCA" should read --BALANCE--.

Column 1

Line 5, "continuation-in-part" should be deleted.

Column 2

Line 14, "8 signals" should read --B signals--.
Line 15, "jectcd" should read --jected--.

Column 3

Line 27, "spectvely," should read --sepctively,--.

Column 5

Line 52, "unk-" should read --unknowns--.
Line 53, "nows" should be deleted.
Line 58, "approximately" should read --appropriately--.

Column 6

Line 2, "baIance" should read --balance--.

UNITED STATES PATENT AND TRADEMARK OFFICE
CERTIFICATE OF CORRECTION

PATENT NO. : 5,202,756
DATED : April 13, 1993
INVENTOR(S) : SASAKI ET AL.

It is certified that error appears in the above-indentified patent and that said Letters Patent is hereby corrected as shown below:

Column 8

Line 19, "5/8," should read --3/8-- (both occurrences).

Column 9

Line 51, "covnersion unti 60" should read --conversion unit 60--.
Line 52, "followin" should read --following--.
Line 53, "palce" should read --place--.

Column 11

Line 21, "it" should read --It-- and "assume" should read --assumed--.

Column 12

Equation (20'), "2Q) should read --2Q--.
Line 23, "if" should read --If--.
Line 24, "$2R_1a_{13}$" should read --$2R_1\ a_{13}$--.
Line 25, "$2G_{1a23}$" should read --$2G_1\ a_{23}$--.
Line 27, "$2B_{1a33}$" should read --$2B_1\ a_{23}$--
Line 45, "(Cy-Ye-)" should read --(Cy-Ye')--.
Line 60, "$R_{20}$" should read --$R_2$--.
Line 62, "multiplication" should be deleted.

Column 13

Line 66, "constants" should read --constants a--.

UNITED STATES PATENT AND TRADEMARK OFFICE
CERTIFICATE OF CORRECTION

PATENT NO. : 5,202,756

DATED : April 13, 1993

INVENTOR(S) : SASAKI ET AL.

It is certified that error appears in the above-indentified patent and that said Letters Patent is hereby corrected as shown below:

Column 14

Line 16, "p" should read --P--.
Line 42, "Then," should read --¶ Then,--.

Column 15

Line 11, "$[b(\lambda 1) - B(\lambda i)]^2$" should read --$[b(\lambda i) - B(\lambda i)]^2$--.
Line 27, "Y-converted" should read --$\chi$-converted--.
Equation (28), "$\begin{bmatrix} R\lambda \\ G\lambda \\ B\lambda \end{bmatrix}$" should read --$\begin{bmatrix} R\gamma \\ G\gamma \\ B\gamma \end{bmatrix}$--.

Line 43, "considercd." should read --considered.--

Column 17

Line 51, "$a_{11}+a_{12} = a_{21}+a_{31}+a_{32}$" should read --$a_{11}+a_{12} = a_{21}+a_{22} = a_{31}+a_{32}$--.
Line 63, "$a_{24} Ye^1(\lambda i)\}^2$" should read --$a_{24} Ye^1(\lambda i)\}\}^2$--

Column 18

Line 20, "are" should be deleted.
Line 36, "$\ell=(\ell_1, \ell_2, _3, \ell_4)$" should read --$\ell=(\ell_1, \ell_2, \ell_3, \ell_4)$--.

UNITED STATES PATENT AND TRADEMARK OFFICE
CERTIFICATE OF CORRECTION

PATENT NO. : 5,202,756
DATED : April 13, 1993
INVENTOR(S) : SASAKI ET AL.

It is certified that error appears in the above-indentified patent and that said Letters Patent is hereby corrected as shown below:

Column 19

Line 59, "consdered" should read --considered--.

Column 21

Line 10, "tures" should read --ture--.
Line 16, Insert: --(38)--.
Line 46, "respectively" should read --respectively--.

Column 22

Line 63, "$2R_1a_{13}$" should read --$2R_1$ $a_{13}$--.
Line 65, "$2G_1a_{13}$" should read --$2G_1$ $a_{23}$--.
Line 68, "$2B_1a_{33}$" should read --$2B_1$ $a_{33}$--.

COLUMN 23

Line 1, "sicne" should read --since--.
Line 23, "equatations" should read --equations--.
Equation 52, "$Q-R_1$" should read --$Q-R_2$--.
Equation 53, "$Q-R_1$" should read --$Q-R_2$--.
Line 55, "using" should read --using $\alpha$--.

Column 24

Line 27, "additons/substractions" should read --additions/subtractions--.

UNITED STATES PATENT AND TRADEMARK OFFICE
CERTIFICATE OF CORRECTION

PATENT NO. : 5,202,756
DATED : April 13, 1993
INVENTOR(S) : SASAKI ET AL.

It is certified that error appears in the above-indentified patent and that said Letters Patent is hereby corrected as shown below:

Column 26

Line 15, "spondign" should read --sponding--.
Line 26, "secodn" should read --second--.
Line 33, "$f_N(\lambda)$" should read --$f_n(\lambda)$--.
Line 45, "2" should read --2,--.

Signed and Sealed this

Fifth Day of April, 1994

Attest:

BRUCE LEHMAN

Attesting Officer      Commissioner of Patents and Trademarks